US011536907B2

(12) United States Patent
Abril et al.

(10) Patent No.: US 11,536,907 B2
(45) Date of Patent: Dec. 27, 2022

(54) CASCADED INTEGRATED PHOTONIC WAVELENGTH DEMULTIPLEXER

(71) Applicant: X Development LLC, Mountain View, CA (US)

(72) Inventors: Joaquin Matres Abril, San Jose, CA (US); Carl Jonas Love Einarsson, Sunnyvale, CA (US)

(73) Assignee: X Development LLC, Mountain View, CA (US)

( * ) Notice: Subject to any disclaimer, the term of this patent is extended or adjusted under 35 U.S.C. 154(b) by 0 days.

(21) Appl. No.: 17/236,822

(22) Filed: Apr. 21, 2021

(65) Prior Publication Data
US 2022/0373739 A1 Nov. 24, 2022

(51) Int. Cl.
*G02B 6/12* (2006.01)
*G02B 6/293* (2006.01)
*G02B 6/122* (2006.01)

(52) U.S. Cl.
CPC ..... *G02B 6/29382* (2013.01); *G02B 6/12016* (2013.01); *G02B 6/1225* (2013.01);
(Continued)

(58) Field of Classification Search
None
See application file for complete search history.

(56) References Cited

U.S. PATENT DOCUMENTS 4,279,464 A  7/1981 Colombini
4,696,536 A  9/1987 Albares et al.
(Continued)

FOREIGN PATENT DOCUMENTS

CN  109687920 A  4/2019
CN  110838886 A  2/2020
(Continued)

OTHER PUBLICATIONS

Miansouree et al., Multifunctional 2.5D metastructures enabled by adjoint optimization, Optica, vol. 7, No. 1, Jan. 2020, 8 pages.
(Continued)

*Primary Examiner* — Michael Stahl
(74) *Attorney, Agent, or Firm* — Christensen O'Connor Johnson Kindness PLLC

(57) ABSTRACT

A photonic integrated circuit includes a photonic device. The photonic device includes an input region configured to receive an input signal including a plurality of multiplexed channels. The photonic device includes a metastructured dispersive region structured to partially demultiplex the input signal into an output signal and a throughput signal. The output signal includes a channel of the multiplexed channels. The throughput signal includes the remaining channels of the multiplexed channels. The photonic device includes an output region and a throughput region optically coupled with the metastructured dispersive region to receive the output signal and the throughput signal, respectively. The metastructured dispersive region includes a heterogeneous distribution of a first material and a second material that structures the metastructured dispersive region to partially demultiplex the input signal into the output signal and the throughput signal.

22 Claims, 11 Drawing Sheets

(52) U.S. Cl.
CPC ............... *G02B 2006/1213* (2013.01); *G02B 2006/12138* (2013.01); *G02B 2006/12164* (2013.01); *G02B 2006/12166* (2013.01)

(56) References Cited

U.S. PATENT DOCUMENTS

| | | |
|---|---|---|
| 5,774,693 A | 6/1998 | Hsu et al. |
| 6,212,318 B1 | 4/2001 | Cryan |
| 6,281,997 B1 | 8/2001 | Alexander et al. |
| 6,567,196 B1 | 5/2003 | Archambault |
| 6,606,427 B1 | 8/2003 | Graves et al. |
| 6,618,535 B1 | 9/2003 | Reynolds |
| 6,734,453 B2 | 5/2004 | Atanackovic et al. |
| 6,772,076 B2 | 8/2004 | Yamamoto et al. |
| 6,885,823 B2 | 4/2005 | Kato et al. |
| 8,532,446 B2 | 9/2013 | Zheng et al. |
| 9,589,757 B1 | 3/2017 | Hannon et al. |
| 10,862,610 B1 | 12/2020 | Schubert et al. |
| 2002/0110306 A1 | 8/2002 | Hamada |
| 2004/0156610 A1 | 8/2004 | Charlton et al. |
| 2006/0126992 A1* | 6/2006 | Hashimoto ........ G02B 6/12009 385/14 |
| 2014/0365188 A1 | 12/2014 | Doerr |
| 2015/0295672 A1 | 10/2015 | Okayama |
| 2016/0012176 A1 | 1/2016 | Liu et al. |
| 2016/0018595 A1 | 1/2016 | Krishnamurthi et al. |
| 2016/0033765 A1 | 2/2016 | Liu et al. |
| 2016/0036550 A1 | 2/2016 | Welch |
| 2016/0119057 A1 | 4/2016 | Mekis et al. |
| 2016/0174902 A1 | 6/2016 | Georgescu et al. |
| 2018/0018757 A1 | 1/2018 | Suzuki |
| 2018/0045953 A1 | 2/2018 | Fan et al. |
| 2020/0257751 A1 | 8/2020 | Engheta et al. |
| 2020/0319409 A1 | 10/2020 | Su et al. |

FOREIGN PATENT DOCUMENTS

| | | |
|---|---|---|
| JP | 2017524966 A | 8/2017 |
| KR | 101885080 B1 | 8/2018 |
| WO | 2017/176370 A1 | 10/2017 |
| WO | 2017/223560 A1 | 12/2017 |
| WO | 2018215774 A1 | 11/2018 |

OTHER PUBLICATIONS

Niemi et al., Wavelength-Division Demultiplexing Using Photonic Crystal Waveguides, IEEE Photonics Technology Letters, vol. 18, No. 1, Jan. 1, 2006, 4 pages.
Piggott et al., Inverse design and demonstration of a compact and broadband on-chip wavelength demultiplexer, arXiv:1504.00095v1, Physics.optics, April 1, 2015, 15 pages.
Piggott et al., Fabrication-constrained nanophotonic inverse design, Scientific Reports, www.nature.com/scientificreports, May 11, 2017, 7 pages.
Shi et al., Silicon photonic grating-assisted, contra-directional couplers, Optics Express, vol. 21, No. 3, Feb. 11, 2013, 18 pages.
Su et al., Inverse design and demonstration of a compact on-chip narrowband three-channel wavelength demultiplexer, arXiv:1709.08809v1, physics.app-ph. Aug. 17, 2017, 6 pages.
Tekeste et al., High efficiency photonic crystal based wavelength demultiplexer, Optics Express, vol. 14, No. 17, Aug. 21, 2006, 12 pages.
Yao et al., Intelligent nanophotonics: merging photonics and artificial intelligence at the nanoscale, Nanophotonics, 2019, 28 pages.
Zhao et al., Multichannel vectorial holographic display and encryption, Light: Science & Applications, 2018, 9 pages.
Mehdizadeh et al., "All Optical 8-channel wavelength division demultiplexer based on photonic crystal ring resonators", Department of Electrical Engineering, Shahid Chamran University of Ahvaz, Dec. 2017, 10th International Conference on Electrical and Electronics Engineering, 5 pages.
CWDM Optical Modules, 4/8/16/18 Channel CWDM Optical Mux/Demux Modules, Space-saving, modular platform for advanced signal processing, Sep. 15, 2016 https://www.grassvalley.com/docs/DataSheets/purple/GVB-1-0432C-EN-DS-CWDM.pdf 2 pages.
OP+CWDM8+UD, 8-Channel Passive CWDM Multiplexer/Demultiplexer, http://www.imaginecommunications.com/products/networking/processing/selenio-6800/selenio-6800-fiber-optics/opcwdm8ud, 2016, 3 pages.
WaveReady 8-Channel Modular Multiplexer/Demultiplexer Upgradeable to 40 Channels, MDX-08MD1Z1xB, www.lumentum.com, 2015, 4 pages.
Vercruysse et al., "Analytical level set fabrication constraints for inverse design", Scientific Reports, www.nature.com/scientificreports, Jun. 21, 2019, 7 pages.
Wavelength-division multiplexing, Wikipedia Article, https://en.wikipedia/org/wiki/wavelength-division_multiplexing, Jan. 28, 2019.
400G CWDM8 MSA 2 km Optical Interface Technical Specifications Revision 1.1., Feb. 13, 2018, 16 pages.
400G CWDM8 10 km Optical Interface Technical Specifications Revision 1.1., Feb. 13, 2018, 16 pages.
Moscoso-Mártir et al. "8-channel WDM silicon photonics transceiver with SOA and semiconductor mode-locked laser", Optics Express 25446, vol. 26, No. 19, Sep. 17, 2018, 14 pages.
Absil et al., "Advances in silicon photonics WDM devices", http://proceedings.spiedigitallibrary.org, SPIE vol. 9010 90100J-1, Oct. 6, 2014, 7 pages.
8-Channel Analog Multiplexer/Demultiplexer with Injection-Current Effect Control, Texas Instruments, Oct. 2012, 21 pages.
Chen, et al., "Neural Ordinary Differential Equations", 32nd Conference on Neural Information Processing Systems (NIPS 2018), Oct. 22, 2018, 18 pages.
Petykiewicz et al., "Active Nanophotonics: Inverse Design and Strained Germanium Light Emitters", A Dissertation Submitted to the Department of Electrical Engineering and the Committee on Graduate Studies of Stanford University, Oct. 2016. 134 pages.
Ying-Shou Lu "Nanophotonic Computational Design", A Dissertation Submitted to the Department of Electrical Engineering and the Committee on Graduate Studies of Stanford University, Jun. 2013, 122 pages.
Piggott, "Automated Design of Photonic Devices", A Dissertation Submitted to the Department of Electrical Engineering and the Committee on Graduate Studies of Stanford University, Jun. 2018, 112 pages.
Lu, et al., "Nanophotonic Computational Design", Optics Express, vol. 21, No. 11, Jun. 3, 2013, 17 pages.
Piggott et al., "Inverse Design and Implementation of a Wavelength Demultiplexing Grating Coupler", Scientific Reports, Nov. 27, 2014, 5 pages.
Piggott et al.,"Silicon Photonics: Design Approach to Integrated Photonics Explores Entire Space of Fabricable Devices", Laser Focus World, Aug. 13, 2018, 5 pages.
Su et al.,Fully-Automated Optimization of Grating Couplers, Optics Express, vol. 26, No. 4m Feb. 2018, 12 pages.
Robinson "First-Principle Derivation of Gain in High-Index-Contrast Waveguides", Optics Express, vol. 16, No. 21, Oct. 13, 2008, 11 pages.
Lalau-Keraly et al., "Adjoint Shape Optimization Applied to Electromagnetic Design", Optical Society of America, 2013, 9 pages.
Yilmaz et al., "Inverse design of efficient and compact 1 x N wavelength demultiplexer", Optics Communications, www.elsevier.com/locate/optcom, Sep. 7, 2019, 7 pages.
International Search Report and Written Opinion, dated Feb. 9, 2021, in corresponding International Patent Application No. PCT/US2020/056674, 10 pages.
International Search Report and Written Opinion, dated Feb. 9, 2021, in corresponding International Patent Application No. PCT/US2020/056695, 13 pages.
U.S. Appl. No. 16/685,473, filed Nov. 15, 2019, 81 pages.
Piggott et al., "Inverse design and demonstration of a compact and broadband on-chip wavelength demultiplexer," Nature Photonics, vol. 9, Jun. 2015, published online May 11, 2015, pp. 374-378.

(56) References Cited

OTHER PUBLICATIONS

International Search Report and Written Opinion, dated Jul. 19, 2022, in corresponding International Patent Application No. PCT/US2022/022561, 8 pages.

* cited by examiner

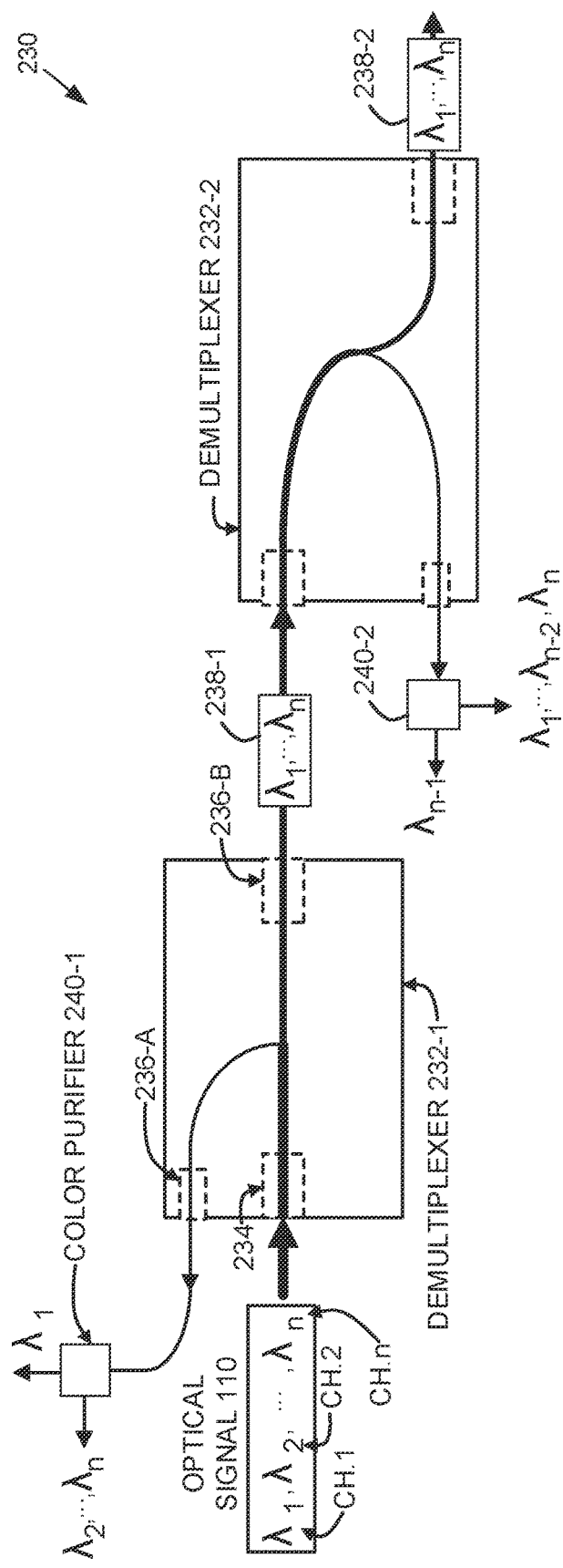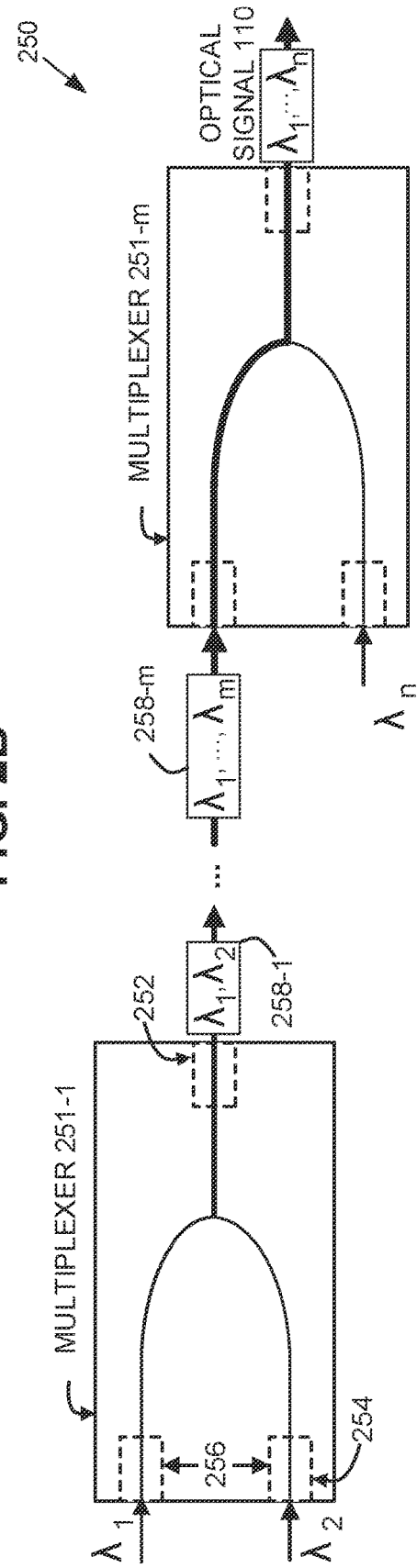
FIG. 2B
FIG. 2C

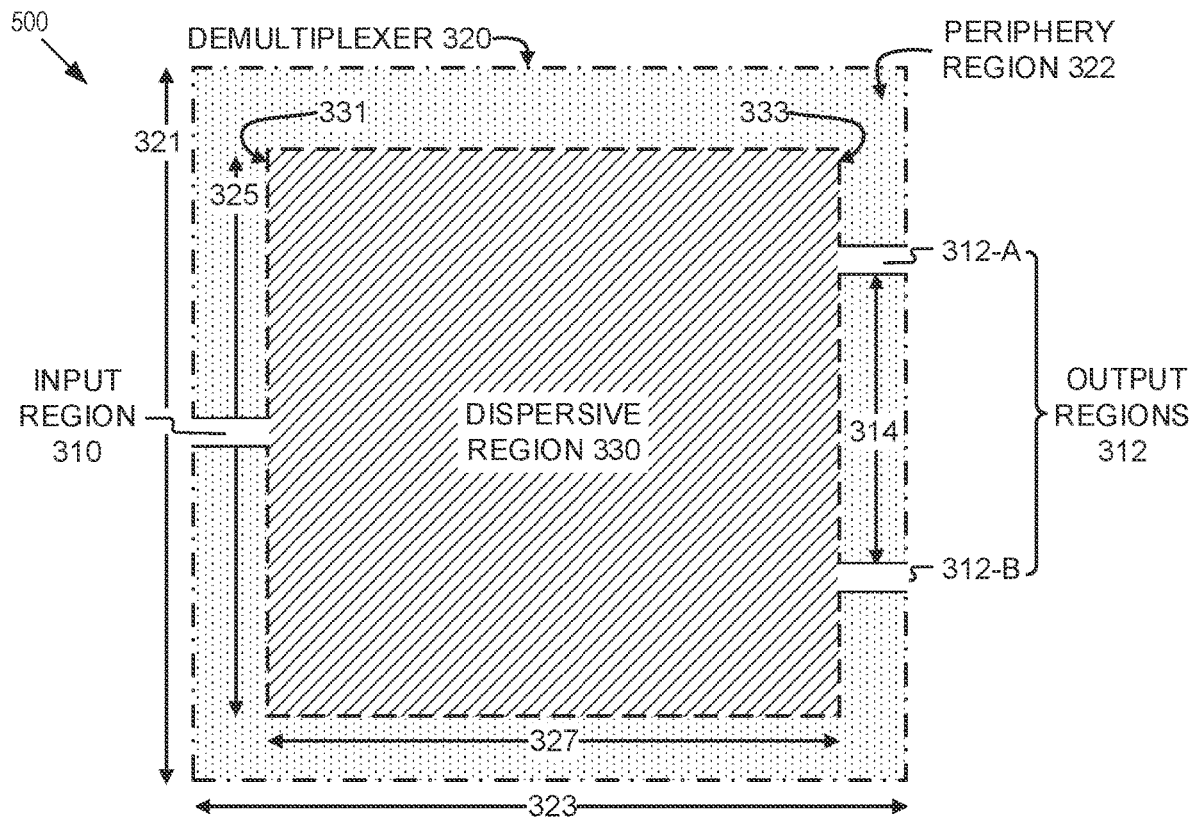
FIG. 3A
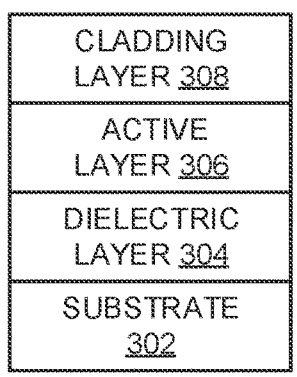 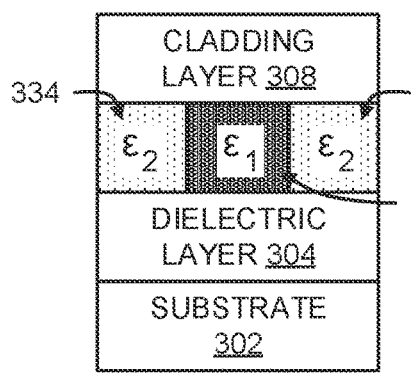 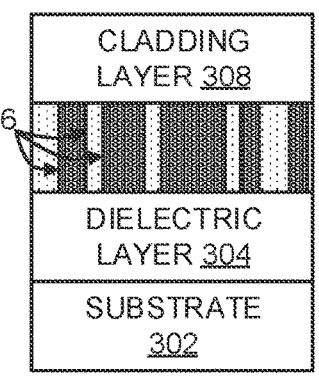
FIG. 3B    FIG. 3C    FIG. 3D

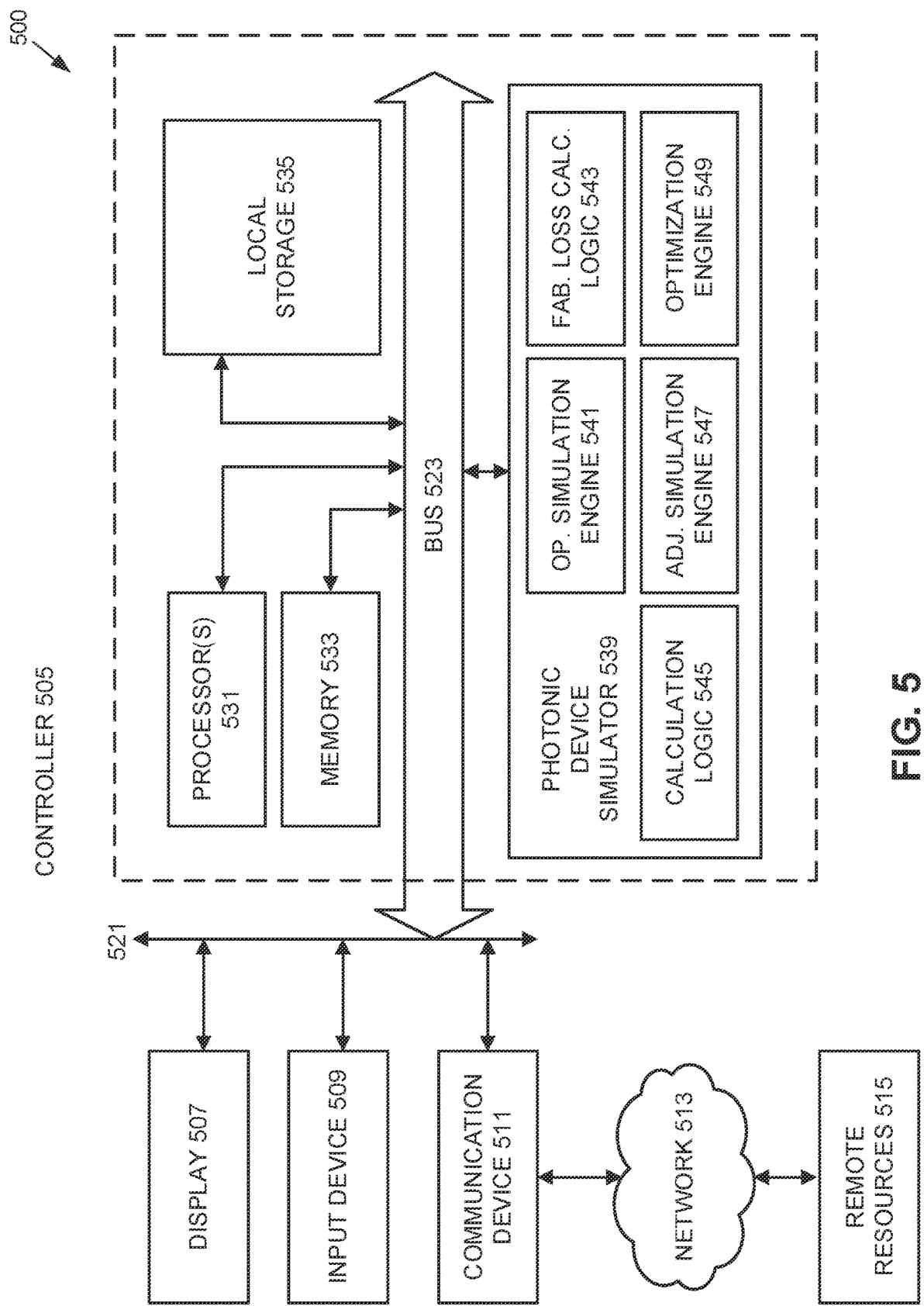

CASCADED INTEGRATED PHOTONIC WAVELENGTH DEMULTIPLEXER

TECHNICAL FIELD

This disclosure relates generally to metastructured photonic devices, and in particular but not exclusively, relates to optical multiplexers and demultiplexers.

BACKGROUND INFORMATION

Fiber-optic communication is typically employed to transmit information from one place to another via modulated light. For example, many telecommunication companies use optical fiber to transmit telephone signals, internet communication, and cable television signals. But the cost of deploying optical fibers for fiber-optic communication may be prohibitive. As such, techniques have been developed to more efficiently use the bandwidth available within a single optical fiber. Wavelength-division multiplexing is one such technique that bundles multiple optical carrier signals onto a single optical fiber using different wavelengths.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. Not all instances of an element are necessarily labeled to simplify the drawings where appropriate. The drawings are not necessarily to scale, emphasis instead being placed upon illustrating the principles being described.

FIG. 2B illustrates an example photonic integrated circuit including cascaded contra-directional cascade demultiplexers, in accordance with embodiments of the present disclosure.

FIG. 2C illustrates an example photonic integrated circuit including cascaded multiplexers, in accordance with embodiments of the present disclosure.

FIG. 3A illustrates an example photonic demultiplexer, in accordance with embodiments of the present disclosure.

FIG. 3B illustrates a cross sectional view of an example photonic demultiplexer in a multilayer structure, in accordance with embodiments of the present disclosure.

FIG. 3C illustrates a second cross sectional view of an example photonic demultiplexer in a multilayer structure, in accordance with embodiments of the present disclosure.

FIG. 3D illustrates a third cross sectional view of an example photonic demultiplexer in a multilayer structure, in accordance with embodiments of the present disclosure.

FIG. 5 is a functional block diagram illustrating a system for generating a design of a photonic integrated circuit, in accordance with embodiments of the present disclosure.

DETAILED DESCRIPTION

Figure 1:
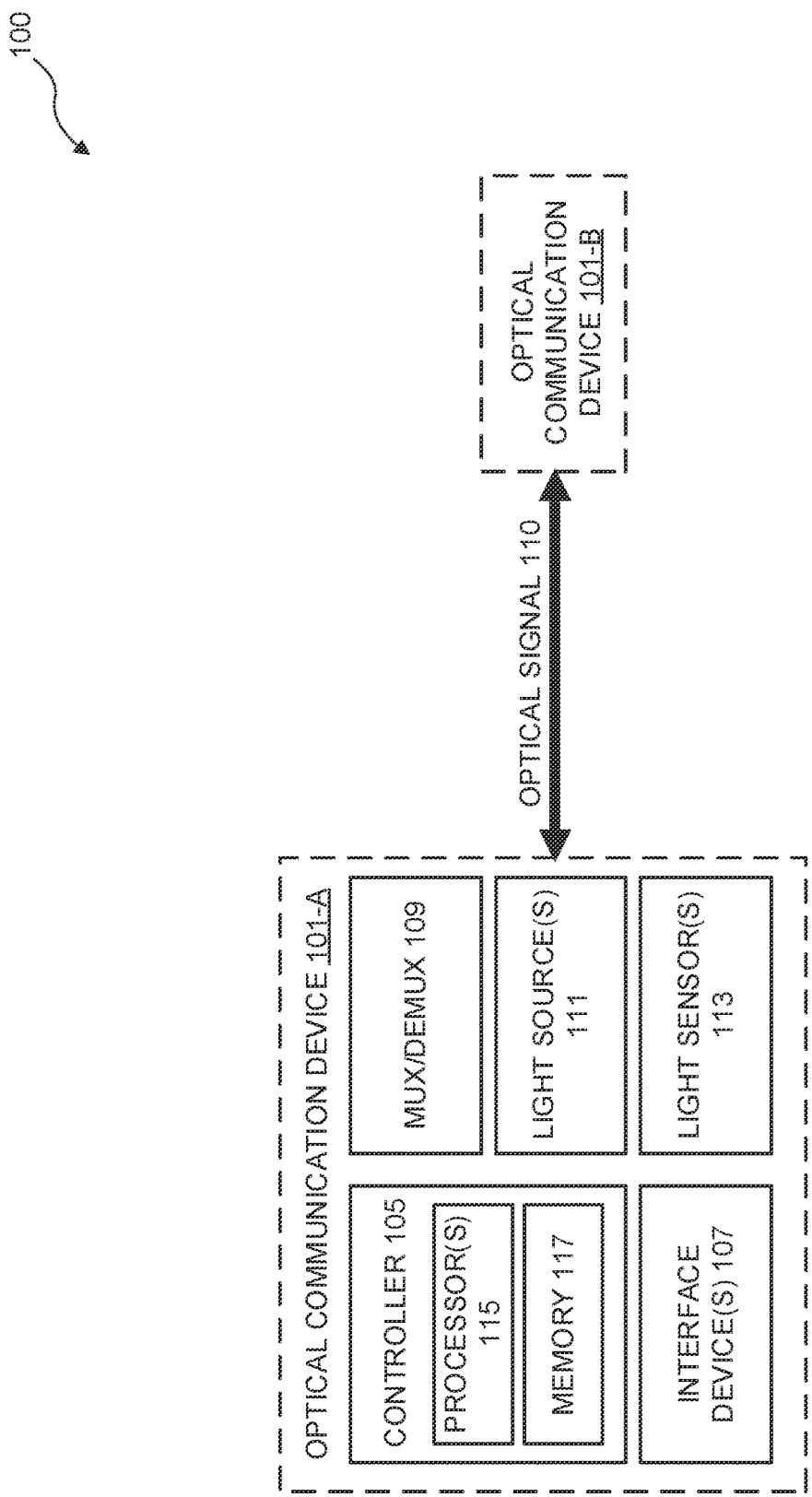
FIG. 1 is a functional block diagram illustrating a system for optical communication between two optical communication devices via an optical signal, in accordance with embodiments of the present disclosure.

Embodiments of photonic integrated circuits, including a cascaded multi-channel photonic demultiplexer, as well as a method for generating a design of photonic integrated circuits are described herein. In the following description, numerous specific details are set forth to provide a thorough understanding of the embodiments. One skilled in the relevant art will recognize, that the techniques described herein can be practiced without one or more of the specific details, or with other methods, components, materials, etc. Description of well-known structures, materials, or operations may be omitted, to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "In some embodiments" or "in an embodiment" in various places throughout this specification are not necessarily all referring to the same embodiment. Furthermore, the particular features, structures, or characteristics may be combined in any suitable manner in one or more embodiments.

Wavelength division multiplexing (e.g., dense wavelength division multiplexing, coarse wavelength division multiplexing, or the like) describes a technique for coupling more than one wavelength channel into a waveguide, such as a fiber optic cable or silicon waveguide, to increase the utilization of available bandwidth in the waveguide. Demultiplexing describes the reverse technique, by which the wavelength channels are separated and read out by an optical communication device. Significant challenges remain in the design and fabrication of multi-channel multiplexing/demultiplexing devices. One approach includes composing an optical circuit of discrete optical elements, such as immersion gratings, dichroic mirrors, filters, or the like, to separate the wavelength channels. Another approach includes designing a metastructured dispersive optical element to multiplex or demultiplex the wavelength channels realized, for example, as a two-channel demultiplexer, a three-channel demultiplexer, a four-channel demultiplexer, a six-channel demultiplexer, an eight channel demultiplexer, a sixteen channel demultiplexer, etc. With each added channel, however, the complexity of the design process and technical limitations including, but not limited to, cross talk, interference, and signal attenuation, become more challenging.

Photonic devices, such as those used for optical communication, are traditionally designed via conventional techniques sometimes determined through a simple guess and check method or manually-guided grid-search in which a small number of design parameters from pre-determined designs or building blocks are adjusted for suitability to a particular application. Metastructured devices may be characterized by a number of design parameters ranging from hundreds to billions or more, dependent on the device size and functionality. In this way, as functionality of photonic devices increases and manufacturing tolerances improve to allow for smaller device feature sizes, optimized device design techniques are introduced to develop optical circuit architectures different from those designed via conventional techniques.

In an illustrative example of the technical challenge posed by wavelength division demultiplexing, a four-channel multiplexed input signal may be provided to a demultiplexer. To demultiplex the four channels in a single optical element, separation of neighboring channels in space is needed to provide each constituent channel to a different output of a single demultiplexer. In so doing, issues may arise including signal attenuation, channel crosstalk, and phase interference effects (e.g., destructive interference). In this way, the size and complexity of a metastructured demultiplexer may scale non-linearly with the number of channels.

Advantageously, photonic integrated circuits may provide improved performance, as well as design and fabrication scalability, when multiple metastructured optical elements are implemented in a cascaded arrangement. A cascade demultiplexer/multiplexer can partially demultiplex an input signal by separating a single output channel from a multiplexed signal for each of a number of stages making up the cascaded arrangement. In this way, the computational and resource demand of design and fabrication of the constituent metastructured photonic devices can scale substantially linearly with the number of channels. Furthermore, constituent metastructured photonic devices of the cascaded arrangement may be tuned individually, for example, by thermal control circuits locally heating individual photonic devices, which is not available to unitary multiplexer/demultiplexers, and may further improve the efficiency of design and optimization of the photonic integrated circuit, where material properties dictate different operating temperatures for efficient partial demultiplexing/multiplexing.

In an illustrative example, a cascade demultiplexer includes three metastructured photonic devices to demultiplex a four-channel input signal. In the first photonic device, the input signal is demultiplexed into a first channel of the four channels and a first throughput signal that carries the remaining three multiplexed channels of the input signal. Similarly, the second photonic device demultiplexes the first throughput signal to separate a second channel of the four channels from a second throughput signal. The third element then separates the third channel and the fourth channel of the input signal. In this way, each photonic device is realized as a two-way demultiplexer, for which an output channel is separated from a throughput signal, until a terminal photonic device separates the two remaining channels into different outputs.

Described herein are embodiments of a photonic integrated circuit (e.g., a cascaded multi-channel photonic demultiplexer and/or multiplexer) having a design obtainable by an inverse design process. More specifically, the inverse design process may employ gradient-based optimization in combination with first-principle simulations to generate a design. Design optimization of photonic integrated circuits without gradient-based techniques may also be used. Advantageously, embodiments and techniques described herein are not limited to conventional techniques used for design of photonic devices, in which a small number of design parameters for pre-determined building blocks are adjusted based on suitability to a particular application. Rather, first-principles based designs are not necessarily dependent on human intuition and generally may result in designs which outstrip current state-of-the-art designs in performance, size, and/or robustness. The embodiments and techniques described herein may provide scalable optimization of a nearly unlimited number of design parameters.

FIG. 1 is a functional block diagram illustrating a system 100 for optical communication (e.g., via wavelength division multiplexing or other techniques) between optical communication devices 101-A and 101-B via optical signal 110, in accordance with embodiments of the present disclosure. More generally, optical communication device 101-A is configured to transmit information by modulating light from one or more light sources into a multi-channel optical signal 110 (e.g., a singular optical signal that includes a plurality of distinct wavelength channels) that is subsequently transmitted from optical communication device 101-A to optical communication device 101-B via an optical fiber, a light guide, a wave guide, or other photonic device. Optical communication device 101-B receives the multi-channel optical signal 110 and demultiplexes each of the plurality of distinct wavelength channels from the multi-channel optical signal 110 to extract the transmitted information. It is appreciated that in some embodiments optical communication devices 101-A and 101-B may be distinct and separate devices (e.g., an optical transceiver or transmitter communicatively coupled via one or more optical fibers to a separate optical transceiver or receiver). However, in other embodiments, optical communication devices 101-A and 101-B may be part of a singular component or device (e.g., a smartphone, a tablet, a computer, optical device, or the like). For example, optical communication devices 101-A and 101-B may both be constituent components on a monolithic integrated circuit that are coupled to one another via a waveguide that is embedded within the monolithic integrated circuit and is adapted to carry optical signal 110 between optical communication devices 101-A and 101-B or otherwise transmit the optical signal between one place and another.

In the illustrated embodiment, optical communication device 101-A includes a controller 105, one or more interface devices 107 (e.g., fiber optic couplers, light guides, waveguides, and the like), a multiplexer (mux), demultiplexer (demux), or combination thereof 109, one or more light sources 111 (e.g., light emitting diodes, lasers, and the like), and one or more light sensors 113 (e.g., photodiodes, phototransistors, photoresistors, and the like) coupled to one another. The controller includes one or more processors 115 (e.g., one or more central processing units, application specific circuits, field programmable gate arrays, or otherwise) and memory 117 (e.g., volatile memory such as DRAM and SAM, non-volatile memory such as ROM, flash memory, and the like). It is appreciated that optical communication device 101-B may include the same or similar elements as optical communication device 101-A, which have been omitted for clarity.

Controller 105 orchestrates operation of optical communication device 101-A for transmitting and/or receiving optical signal 110 (e.g., a multi-channel optical signal having a plurality of distinct wavelength channels or otherwise). Controller 105 includes software (e.g., instructions included in memory 117 coupled to processor 115) and/or hardware logic (e.g., application specific integrated circuits, field-programmable gate arrays, and the like) that when executed by controller 105 causes controller 105 and/or optical communication device 101-A to perform operations.

In some embodiments, controller 105 may choreograph operations of optical communication device 101-A to cause light sources 103 to generate a plurality of distinct wavelength channels that are multiplexed via mux/demux 109 into a multi-channel optical signal 110 that is subsequently transmitted to optical communication device 101-B via interface device 107. In other words, light sources 111 may output light having different wavelengths (e.g., 1271 nm, 1291 nm, 1311 nm, 1331 nm, 1511 nm, 1531 nm, 1551 nm, 1571 nm, or otherwise) that may be modulated or pulsed via controller 105 to generate a plurality of distinct wavelength channels representative of information. The plurality of distinct wavelength channels are subsequently combined or otherwise multiplexed via mux/demux 109 into a multi-channel optical signal 110 that is transmitted to optical communication device 101-B via interface device 107. In some embodiments, controller 105 may choreograph operations of optical communication device 101-A to cause a plurality of distinct wavelength channels to be demultiplexed via mux/demux 109 from a multi-channel optical signal 110 that is received via interface device 107 from optical communication device 101-B.

In some embodiments, the mux/demux 109 of optical communication device 101-A and/or optical communication device 101-B are realized as a cascaded arrangement of multiplexing and/or demultiplexing photonic devices. Rather than a unitary mux/demux 109, structured to multiplex/demultiplex a multichannel input signal in a single dispersive region, a cascaded demultiplexer/multiplexer may select and separate a channel from a multiplexed signal for each of a number of photonic devices making up the cascaded arrangement.

As described in more detail in reference to FIGS. 2A-2E, in cascade demux 109, a first photonic device may take in the optical signal 110 and may output two components: (i) an output signal including a first channel of the channels making up the optical signal 110; and (ii) a first throughput signal including the remaining channels of the optical signal 110, which may be or include each of the channels of the optical signal other than the first channel. Subsequent the first photonic device, a second photonic device may take in the first throughput signal and may output two components: (i) a second output signal including a second channel of the channels making up the optical signal 110; and (ii) a second throughput signal including the remaining channels of the optical signal, which may be or include each channel of the optical signal 110 other than the first channel or the second channel. In this way, the mux/demux 109 may include a number of photonic devices in a cascaded arrangement, such that the optical signal is multiplexed/demultiplexed according to a demultiplexing sequence, adding or isolating one channel per photonic device, and culminating in a terminal element that outputs two channels, rather than an output channel and a throughput signal. Each photonic device may partially demultiplex its respective optical input, either the optical signal 110 or a throughput signal, to optically separate a respective channel from the remaining channels.

Each photonic device may include a metastructured dispersive region, structured to effect an optical transformation on the input signal (e.g., multiplexing, demultiplexing, partial demultiplexing, or other arbitrary transformations). As such, the cascade demux 109 may operate in transmission or contra-directional (also referred to as "reflection") modes, and may also incorporate filter elements, such as channel purifiers. As described in more detail in reference to FIG. 2A, channel purifiers may be or include bandpass, highpass, or lowpass filters, such that channels other than the output channel for each photonic device are attenuated, to provide improved signal quality.

It is appreciated that in some embodiments certain elements of optical communication device 101-A and/or 101-B may have been omitted to avoid obscuring certain aspects of the disclosure. For example, optical communication devices 101-A and 101-B may include amplification circuitry, lenses, or other components to facilitate transmitting and receiving optical signal 110. It is further appreciated that in some embodiments optical communication devices 101-A and/or 101-B may not necessarily include all elements illustrated in FIG. 1. For example, In some embodiments optical communication device 101-A and/or 101-B are passive devices that operate as an intermediary device that may passively multiplex a plurality of distinct wavelength channels into multi-channel optical signal 110 and/or demultiplex a plurality of distinct wavelength channels from multi-channel optical signal 110.

FIGS. 2A, 2B, 2C, and 2E respectively illustrate example photonic integrated circuits 200, 230, 250, and 260 including multiple photonic devices in a cascaded arrangement, such as cascaded demultiplexers 220, cascaded demultiplexers 232, or cascaded multiplexers 251. Photonic integrated circuits 200, 230, 250, and 260 are possible embodiments of mux/demux 109 illustrated in FIG. 1, and which may be part of a silicon photonic device, silicon on insulator device, or other system, to multiplex or demultiplex an optical signal (e.g., optical signal 110 of FIG. 1). In some embodiments, photonic devices include metastructured dispersive regions, formed by heterogeneously distributing two or more materials having disparate indices of refraction. The metastructures may define material interface patterns structured to apply a transformation to an input signal including, but not limited to, transmission demultiplexing, reflection demultiplexing, multiplexing, or other arbitrary transformations, such as filtering mode selection. A single metastructured dispersive region may be structured to effect multiple transformations to an input signal including, but not limited to, partial demultiplexing and attenuation of the remaining channels in the output signal relative to the output channel.

Figure 2A:
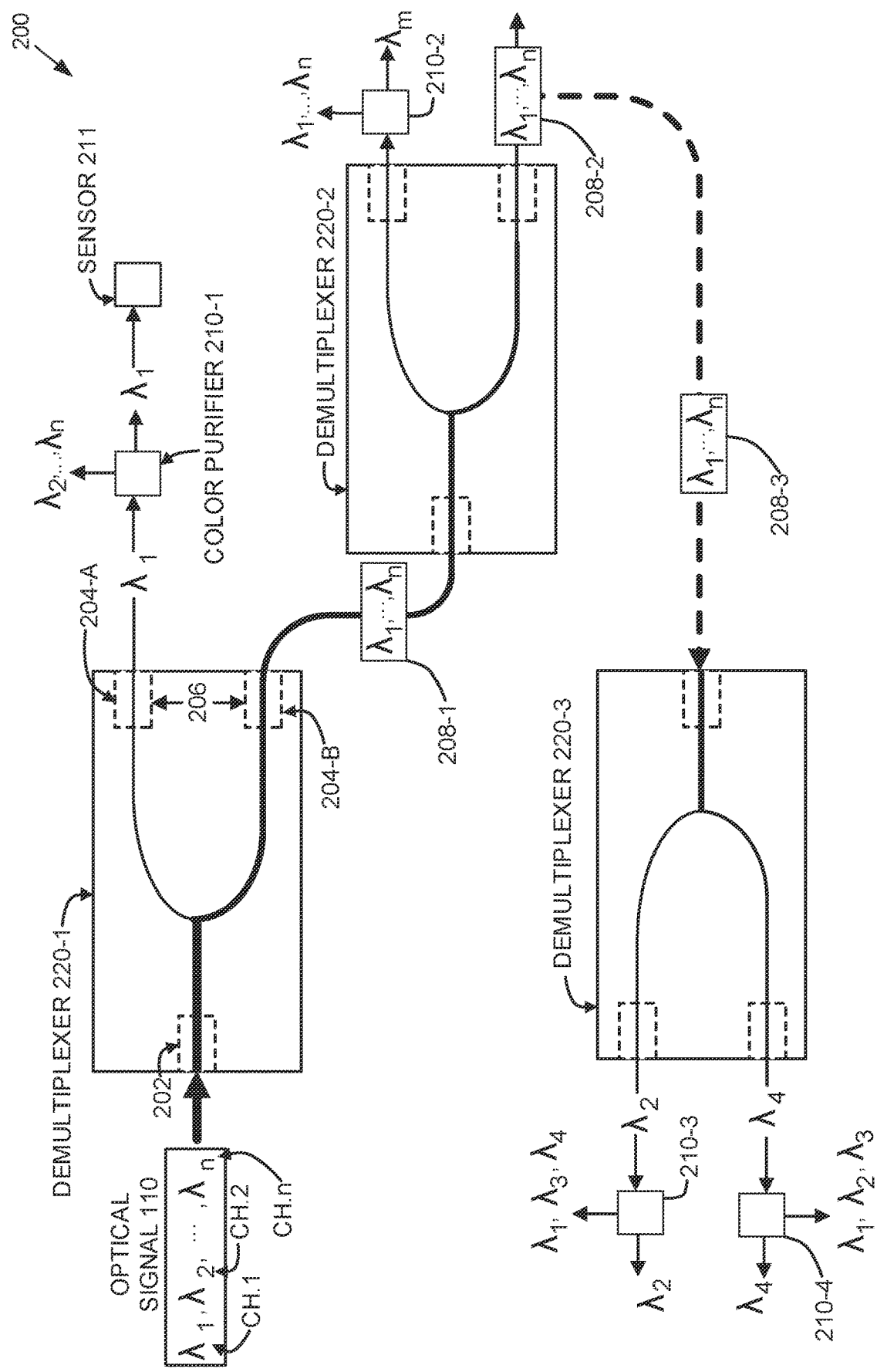
FIG. 2A illustrates an example photonic integrated circuit including cascaded demultiplexers, in accordance with embodiments of the present disclosure.

FIG. 2A illustrates an example photonic integrated circuit 200 including cascaded demultiplexers 220, in accordance with embodiments of the present disclosure. The photonic integrated circuit 200 may include an input region and multiple output regions, such that the multiplexers 220 (e.g., demultiplexer 220-1 and demultiplexer 220-2) are optically coupled in a cascaded arrangement. In this way, each demultiplexer 220 includes an input region 202 and multiple output regions 204 separated by a separation distance 206. The output regions 204 include an output region 204-A and a throughput region 204-B. The cascaded arrangement of photonic optical circuit 200 provides for the input region 202 of a first demultiplexer 220-1 to serve as an input region for the photonic optical circuit 200, to receive an optical signal 110 (e.g., optical signal 110 of FIG. 1). In some embodiments, the photonic integrated circuit 200 includes multiple Channel purifiers 210 optically coupled with the output regions 204. In some embodiments, the photonic integrated circuit includes additional demultiplexers 220, including, but not limited to a third demultiplexer 220-3. Where the optical signal includes four distinct channels, the third demultiplexer 220-3 can act as a terminal demultiplexer, such that it includes two output regions 204, and may include a channel purifier 210 on each output region 204. The output of the channel purifier may be provided to a sensor 211, as part of an optical communication device (e.g., optical communication device 101-A of FIG. 1).

In the illustrated embodiment, the first demultiplexer 220-1 is a partial demultiplexer configured to receive multi-channel optical signal 110 that includes multiple distinct wavelength channels (e.g. a first distinct wavelength channel corresponding to Ch. 1, a second distinct wavelength channel corresponding to Ch. 2, a third distinct wavelength channel corresponding to Ch. 3, up to "n" channels, where n is a positive integer) via input region 202. Where each of the demultiplexers 220 include an input region 202, the input region 202 for the first demultiplexer 220-1 is optically coupled with a source of the optical signal 110, such as signal carrier (e.g., optical fiber), or other input optical couplers (e.g., input gratings, prisms, etc.). By contrast, the input region 202 of the second demultiplexer 220-1 is optically coupled with the input region 202 of the first demultiplexer 220-1 via the throughput region 204-B of the first demultiplexer 220-1 to receive a first throughput signal 208-1, thereby defining a cascaded arrangement of the photonic devices included in the photonic integrated circuit 200. Similarly, in a cascaded arrangement including more than two demultiplexers 220 (e.g., where "n" is greater than three), each subsequent demultiplexer 220 may be optically coupled with the input region 202 via the throughput region 204-B of the preceding demultiplexer 220. In some embodiments, the number of demultiplexers 220 in the cascaded arrangement of FIG. 2A is n-1, or one less than the number of wavelength channels in the optical signal 110, although the cascaded arrangement may include additional and/or alternative photonic devices.

As part of the cascaded arrangement of demultiplexers, each photonic device may be designed (e.g., by inverse design) to partially demultiplex a distinct wavelength channel from a multiplexed channel (e.g., the multi-channel optical signal 110). The photonic device may be structured to guide the distinct wavelength channel to the output region 204-A and the remaining wavelength channels to the throughput region 204-B. In some embodiments, the plurality of output regions 204 include, correspond to, or are otherwise coupled to respective optical waveguides (e.g., interface devices 107 illustrated in FIG. 1). In this way, the output regions 204A of the demultiplexers 220 may serve as output regions of the photonic integrated circuit 200, with each output region optically coupled with a respective photonic device of the cascaded arrangement.

In some embodiments, constituent wavelength channels of the optical signal 110 have different center wavelengths (e.g., any combination of 1271 nm, 1291 nm, 1311 nm, 1331 nm, 1511 nm, 1531 nm, 1551 nm, or 1571 nm). In some embodiments, the cascaded arrangement is provided such that each subsequent demultiplexer 220 outputs a longer wavelength channel, such that the first channel "Ch.1" that is demultiplexed by the first demultiplexer 220-1 is characterized by a first center wavelength "$\lambda_1$" that is shorter than a second center wavelength "$\lambda_2$" of a second channel "Ch.2" that is demultiplexed by the second demultiplexer 220-2. In some embodiments, the plurality of output regions 204-A may each be optically coupled with a respective light sensor 211 (e.g., light sensor 113 of FIG. 1) to convert the optical signals demultiplexed from the multi-channel optical signal 110 into electrical signals for further processing.

In some embodiments, the cascaded arrangement defines a demultiplexing sequence, describing an order of partial demultiplexing of the optical signal 110. For example, performance of the demultiplexers 220 may be improved through application of a demultiplexing sequence defined for an optical signal 110 including n channels and a photonic integrated circuit 200 including n-1 demultiplexers 220:

$$\text{output}(i) = \begin{cases} \text{channel}(j), & \text{for odd } i \\ \text{channel}(n-j), & \text{for even } i \end{cases} \quad (1)$$

where "i" is an integer from 1 to n-1, "j" is an integer defined by rounding the ratio of i and two to the next-largest integer, "output(i)" describes a respective output signal of a corresponding one of the n-1 photonic devices, and "channel(j)" or "channel(n-j)" describes a respective channel of the plurality of multiplexed channels included in the respective output signal of the corresponding one of the n-1 photonic devices. For example, for a sequence of values of i=1, 2, 3, 4, 5, 6, 7, 8, a corresponding sequence of values of j=1, 1, 2, 2, 3, 3, 4, 4. In terms of a mathematical operation, "j" is defined as j=ceiling (i/2). Other example sequences are also contemplated. For example, the demultiplexing sequence could be reversed, by defining output(i) as:

$$\text{output}(i) = \begin{cases} \text{channel}(j), & \text{for even } i \\ \text{channel}(n-j), & \text{for odd } i \end{cases} \quad (2)$$

In an illustrative example, the optical signal 110 may include four channels (n=4), in order of decreasing energy, $\lambda_i < \lambda_2 < \lambda_3 < \lambda_4$. In this example, the photonic integrated circuit 200 includes three demultiplexers 220 (e.g., photonic devices), structured to partially demultiplex the optical signal 110 according to the demultiplexing sequence: output$_1$=$\lambda_1$, output$_2$=$\lambda_3$, output$_3$=$\lambda_2$. In some embodiments, $\lambda_1$ is about 1271 nm, $\lambda_2$ is about 1291 nm, and $\lambda_3$ is about 1311 nm. The term "about" is used here to indicate accordance with the stated value within a range of ±20%.

Channel purifiers 210 may be provided as part of the photonic integrated circuit 200 to further improve the isolation of each output channel. The channel purifiers 210 may be or include bandpass filters, high pass filters, low pass filters, or the like, and may be selected to attenuate and/or reject the channels of the corresponding throughput signal 208. For example, a first channel purifier 210-1 may be a bandpass filter characterized by a passband centered around the center wavelength of the first output channel "$\lambda_1$," such that the first channel purifier transmits the first channel and rejects the remaining channels (e.g., Ch.2-Ch. "n"). In another example, where the center wavelength of the first output channel is higher than the remaining channels, the first channel purifier 240-1 may be a high-pass filter characterized by a cutoff wavelength between the first channel and the second channel. In this way, the demultiplexers 220 and the channel purifier 210 may partially demultiplex the distinct wavelength channel with an attenuation of greater than 30 dB overall on the other constituent channels in the output without affecting the throughput signal 208. For example, the metastructured dispersive region may be structured to generate an output signal that include the output channel and a second channel, where the second channel has a lower optical power than the output channel. In some cases, the demultiplexer 220 may attenuate the remaining channels of the optical signal 110 by about 10 dB or more relative to the output channel, and the channel purifier 210 may attenuate the remaining channels of the optical signal 110 by about 20 dB or more relative to the output channel. The term "about" is used here to indicate accordance with the stated value within a range of ±20%.

In some embodiments, the photonic integrated circuit 200 may include one or more thermal circuits including temperature control elements in thermal communication with the constituent photonic devices. The thermal circuit may be or include active and/or passive elements to control and/or maintain each photonic device at an individual temperature. Advantageously, individually tuning, controlling, or maintaining a temperature of each photonic device individually may improve the operation of the demultiplexers 220 in light of the temperature dependency of active materials. For example, temperature dependency may be due at least in part to thermal sensitivity of refractive materials (e.g., a dependence of index of refraction on temperature and/or thermal expansion) making up the demultiplexers 220. Temperature control circuits may include resistive heating elements and/ or a thermal mass, as an approach to providing a stable temperature set point for operation.

FIG. 2B illustrates an example photonic integrated circuit 230 including cascaded contra-directional cascade demultiplexers 232, in accordance with embodiments of the present disclosure. Like photonic integrated circuit 200, photonic integrated circuit 230 includes multiple photonic devices optically coupled in a cascaded arrangement. The photonic integrated circuit 230 may be structured to receive a multiplexed input optical signal 110 (e.g., optical signal 110 of FIG. 1) and to partially demultiplex a distinct wavelength channel of the optical signal 110 at each photonic device. For example, the optical signal 110 may include multiple constituent wavelength channels (e.g., Ch.1, Ch.2, Ch.3, . . . , Ch. "n"), as described in reference to FIG. 2A. As illustrated, the photonic devices of photonic integrated circuit 230 are contra-directional demultiplexers 232. Demultiplexers 232 may each include an input region 234, an output region 236-A, and a throughput region 236-B. The output regions 236-A may be optically coupled with channel purifiers 240-1 to provide an output channel of the photonic integrated circuit 230, while the throughput regions 236-B may be optically coupled with a subsequent demultiplexer 232 to provide a throughput signal 238 as part of the cascaded arrangement. The photonic integrated circuit 230 may implement a demultiplexing sequence as described in reference to FIG. 2A.

In contrast to the photonic integrated circuit 200 of FIG. 2A, photonic integrated circuit 230 includes contra-directional demultiplexers 232 that are structured to reflect or otherwise redirect the output channel (e.g., Ch.1, Ch.2, etc.) back toward the input region 234 or away from the throughput region 236-B. Instead of transmitting the output channel parallel to the throughput signal 238, the demultiplexers 232 include the output region 236-A on different side of the demultiplexer 232 than that of the throughput region 236-B. In the illustrated example, a first demultiplexer 232-1 includes the output region 236-A disposed on the same side as the input region 234, opposite to the throughput region 236-B. The first demultiplexer 232-1 is structured to output the first channel of the optical signal 110 (e.g., $\lambda_1$) counter to the direction of the input signal, also referred to as a contra-directional configuration. As an illustrative example, the first demultiplexer 232-1 may include a first side and a second side, may be provided with the input region 234 and the output region 236-A on the first side, and may be provided with the throughput region 236-B on the second side. The first side and the second side may be opposite sides of the demultiplexer 232-1, or may be neighboring sides. Advantageously, reflecting the first channel may reduce crosstalk or may otherwise improve overall performance of the photonic integrated circuit 230, at least in part by increasing the separation between the first channel and a first throughput signal 238-1 (e.g., akin to the separation distance 206 of FIG. 2A). Combinations of contra-directional and throughput demultiplexers 232 may be incorporated into embodiments of the photonic integrated circuits 200 and 230. Advantageously, the contra-directional configuration may permit the photonic integrated circuit to exhibit improved overall performance. For example, demultiplexers may be selected to minimize the number of waveguide bends included in an overall photonic integrated circuit, which may, in turn, reduce losses. Similarly, the total area of the photonic integrated circuit may be reduced by selecting a combination of contra-directional and throughput photonic devices.

In some embodiments, the cascaded arrangement of photonic integrated circuit 230 includes "n-1" demultiplexers 232, or one fewer than the number of channels included in the optical signal 110, such that a terminal demultiplexer 232 outputs two channels, rather than a single channel "$\lambda_n$," and a throughput signal 238. As such, the terminal demultiplexer 232 may be structured as a transmission demultiplexer (e.g., demultiplexer 220 of FIG. 2A) or as a contra-directional demultiplexer 232. In an illustrative example, the optical signal 110 includes four multiplexed wavelength channels, and the photonic integrated circuit includes a third demultiplexer 232, having two output regions 236-A, structured to output the third and fourth wavelength channels of the optical signal 110, for example, to light sensors of an optical communication device (e.g., optical communication device 101-A of FIG. 1). In some embodiments, the cascaded arrangement is provided such that each subsequent demultiplexer 232 outputs a longer wavelength channel, such that the first channel "Ch.1" that is demultiplexed by the first demultiplexer 232-1 is characterized by a first center wavelength "$\lambda_1$" that is shorter than a second center wavelength "$\lambda_2$" of a second channel "Ch.2" that is demultiplexed by the second demultiplexer 232-2.

FIG. 2C illustrates an example photonic integrated circuit 250 including cascaded multiplexers, in accordance with embodiments of the present disclosure. The photonic integrated circuit 250 includes multiple multiplexers 251, each including multiple input regions 254 and a throughput region 252. Each subsequent multiplexer 251 in the cascaded arrangement increases the number of channels in a throughput channel 258 by one or more, such that the photonic integrated circuit generates a multiplexed optical signal, which can be an example of optical signal 110. The multiplexers 251 may have disparate numbers of input regions 254, separated by a distance 256. In some embodiments, each multiplexer 251 is individually tuned as part of an inverse design process.

In an illustrative example, a first multiplexer 251-1 is a two-channel multiplexer configured to receive a two distinct signals (e.g., two distinct wavelength channels including the first distinct wavelength channel, Ch. 1, and the second distinct wavelength channel, Ch. 2, with respective center wavelengths of $\lambda_1$ and $\lambda_2$), each at a respective input region 254 (e.g., a plurality of waveguides that may correspond to interface devices 107 illustrated in FIG. 1). Multiplexer 251-1 is structured to multiplex the wavelength channels into a first throughput signal 258-1 that is provided to a subsequent multiplexer of the cascaded arrangement. A terminal multiplexer 251-$m$ may output the optical signal 110 including a number of channels equal to "n," where "m" is a nonzero integer one fewer than "m." For example, where the optical signal 110 includes four distinct wavelength channels (n=4), the cascaded arrangement of photonic integrated circuit 250 may include three multiplexers 251 (m=3). It is appreciated that in some embodiments, demultiplexers 220 of FIG. 2A, demultiplexers 232 of FIG. 2B, and multiplexers 251 of FIG. 2C may be bidirectional such that a single photonic integrated circuit may function as a demultiplexer or a multiplexer.

Figure 2D:
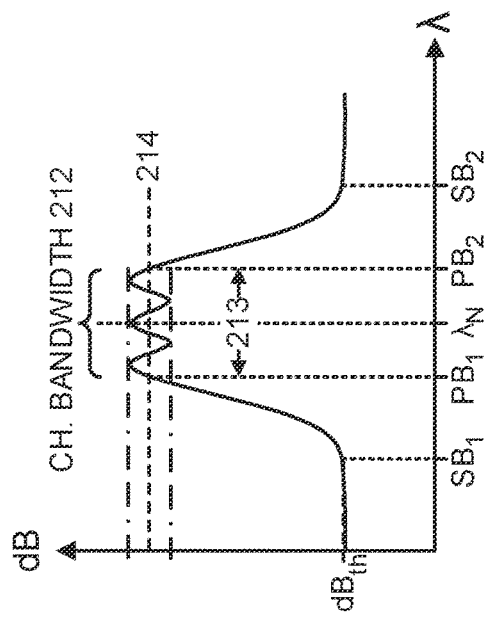
FIG. 2D illustrates an example distinct wavelength channel of a multi-channel optical signal, in accordance with embodiments of the present disclosure.

FIG. 2D illustrates an example distinct wavelength channel of a multi-channel optical signal (e.g., Ch. 1, Ch. 2, or otherwise included in the multi-channel optical signal 110 illustrated in FIGS. 1, 2A, and 2B), in accordance with embodiments of the present disclosure. The example channel, "n", may be representative of an individual channel included in a plurality of distinct wavelength channels, including the two distinct wavelength channels, of the multi-channel optical signal that may be demultiplexed and/or multiplexed by demultiplexer 220 of FIG. 2A and/or multiplexer 251 of FIG. 2C. Each of the distinct wavelength channels may have different center wavelengths ($\lambda_n$) including at least one of 1271 nm, 1291 nm, 1311 nm, 1331 nm, 1511 nm, 1531 nm, 1551 nm, 1571 nm, or otherwise. In the illustrated embodiment of FIG. 2D, the distinct wavelength channel has a channel bandwidth 212 of approximately 13 nm wide. However, in other embodiments the channel bandwidth may be different than 13 nm wide. Rather, the channel bandwidth may be considered a configurable parameter that is dependent upon the structure of mux/demux 107 of FIG. 1, demultiplexer 220 of FIG. 2A, and/or multiplexer 251 of FIG. 2C. For example, in some embodiments each of the plurality of distinct wavelength channels may share a common bandwidth that may correspond to 13 nm or otherwise.

The channel bandwidth 212 may be defined as the width of a passband region 213 (i.e., the region defined as being between $PB_1$ and $PB_2$). The passband region 213 may represent an approximate power transmission of a demultiplexer or multiplexer. It is appreciated that in some embodiments the passband region 213 may include ripple as illustrated in FIG. 2D, which corresponds to fluctuations within the passband region 212. In one or more embodiments, the ripple within the passband region may be +/−2 dB or less, +/−1 dB or less, +/−0.5 dB or less, or otherwise. In some embodiments, the channel bandwidth 212 may be defined by the passband region 212. In other embodiments, the channel bandwidth 212 may be defined as the measured power above a threshold (e.g., $dB_{th}$).

In some embodiments, isolation of a given one of the plurality of distinct wavelength channels (i.e., defined by channel bandwidth 212) from each other one of the distinct wavelength channels may also be considered when optimizing the design. The isolation may be defined as a ratio between the passband region 212 and the stopband regions (e.g., regions less than $SB_1$ and greater than $SB_2$). It is further appreciated that transition band regions (e.g., a first transition region between $SB_1$ and $PB_1$ and a second transition region between $PB_2$ and $SB_2$) are examples and may be exaggerated for the purposes of illustration. In some embodiments, optimization of the design of the photonic integrated circuits described above may also include a target metric for a slope, width, or the like of the transition band regions.

Figure 2E:
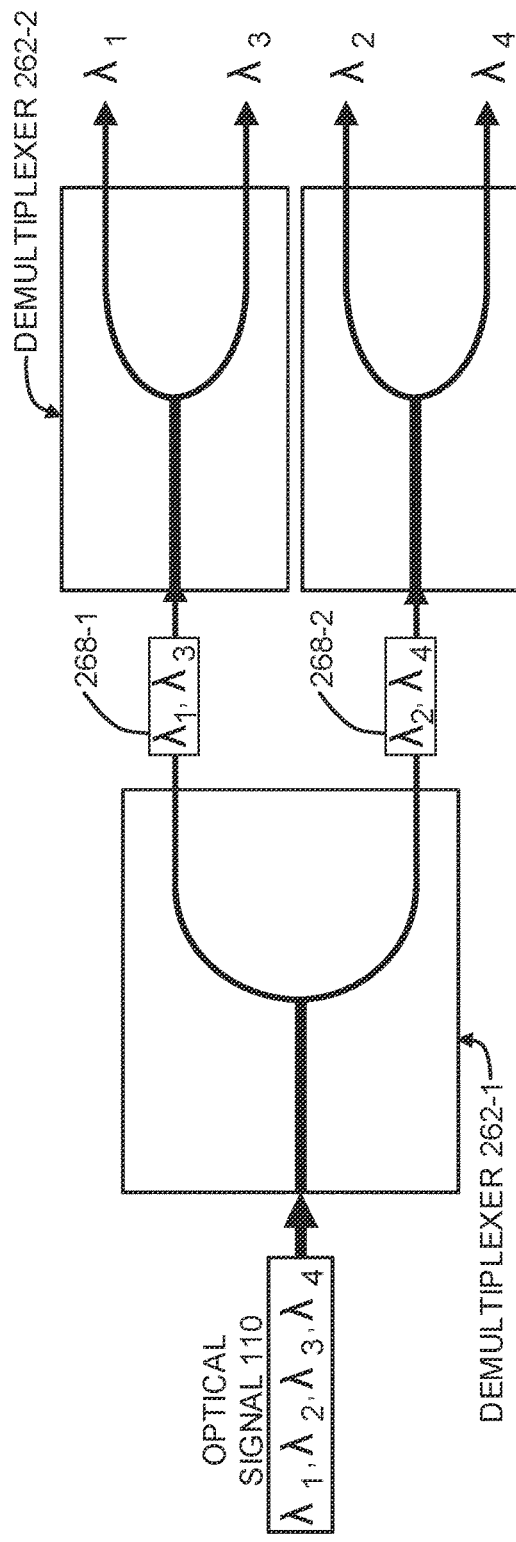
FIG. 2E illustrates an example photonic integrated circuit including parallel cascade demultiplexers, in accordance with embodiments of the present disclosure.

FIG. 2E illustrates an example photonic integrated circuit 260 including parallel cascade demultiplexers, in accordance with embodiments of the present disclosure. Rather than including only two-way multiplexers or demultiplexers, photonic integrated circuit 260 demonstrates that a cascaded arrangement (e.g., photonic integrated circuit 200 of FIG. 2A) may be provided with parallel cascaded photonic devices. The first demultiplexer 262-1 is structured to generate two throughput signals 268, rather than an output channel and a single throughput signal 268. Where the input optical signal includes four channels (n=4) the first throughput signal 268-1 may include the first two channels, while the second throughput signal 268-2 includes the third and fourth channels.

Similar to the photonic integrated circuit 200, a second demultiplexer 262-2 may be optically coupled with the first demultiplexer to receive the first throughput signal 268-1. In contrast, however, a third demultiplexer 262-3 may also be optically coupled with the first demultiplexer 262-1 to receive the second throughput signal 268-2. In this way, the cascaded arrangement of the photonic integrated circuit 260 may define a branched cascaded structure, rather than a serial cascaded structure, and at least one of the constituent photonic devices may be structured to separate an input signal, which may be a throughput signal 268, into two throughput signals 268. It is appreciated that the parallel cascade arrangement described may be applied to the cascade multiplexer of FIG. 2C, where the photonic devices described as demultiplexers 262 are designed to operate bidirectionally.

FIG. 3A illustrates an example photonic demultiplexer 320, in accordance with embodiments of the present disclosure. Photonic demultiplexer 320 is one possible implementation of a constituent element of a cascade mux/demux 109 of FIG. 1, demultiplexers 220 of FIG. 2A, demultiplexers 232 of FIG. 2B, multiplexers 251 of FIG. 2C. It is further appreciated that while discussion may be directed towards photonic integrated circuits demultiplexing a plurality of distinct wavelength channels from a multi-channel optical signal, that in other embodiments, a demultiplexer (e.g., demultiplexer 320) may also or alternatively be capable of multiplexing a plurality of distinct wavelength channels into a multi-channel optical signal, in accordance with embodiments of the present disclosure.

FIG. 3A illustrates a planar view of an active layer of demultiplexer 320 defined by a width 321 and a length 323 of the demultiplexer 320. As illustrated, demultiplexer 320 includes an input region 310 (e.g., comparable to input region 202 illustrated in FIG. 2A), a plurality of output regions 312 (e.g., comparable to plurality of output regions 204 illustrated in FIG. 2A), and a dispersive region optically disposed between the input region 310 and plurality of output regions 312. The input region 310 and plurality of output regions 312 (e.g., 312-A and 312-B) are each optically coupled to the dispersive region 330 and may correspond to waveguides (e.g., slab waveguide, strip waveguide, slot waveguide, or the like). The dispersive region 330 includes a first material and a second material (see, e.g., FIG. 3D) heterogeneously distributed to form a plurality of interfaces that each correspond to a change in refractive index of the dispersive region 330. The plurality of interfaces, in turn, collectively structure the dispersive region 330 to optically separate a constituent channel (e.g., Ch. 1, Ch. 2, Ch. "n," or otherwise illustrated in FIG. 2A) from a multi-channel optical signal (e.g., optical signal 110 illustrated in FIG. 1) and to provide a throughput signal to a subsequent demultiplexer 320 in a cascaded arrangement (e.g., photonic integrated circuit 200 of FIG. 2A). The throughput signal provided to the subsequent demultiplexer 320 includes the remaining channels other than the separated channel.

Figure 4A:
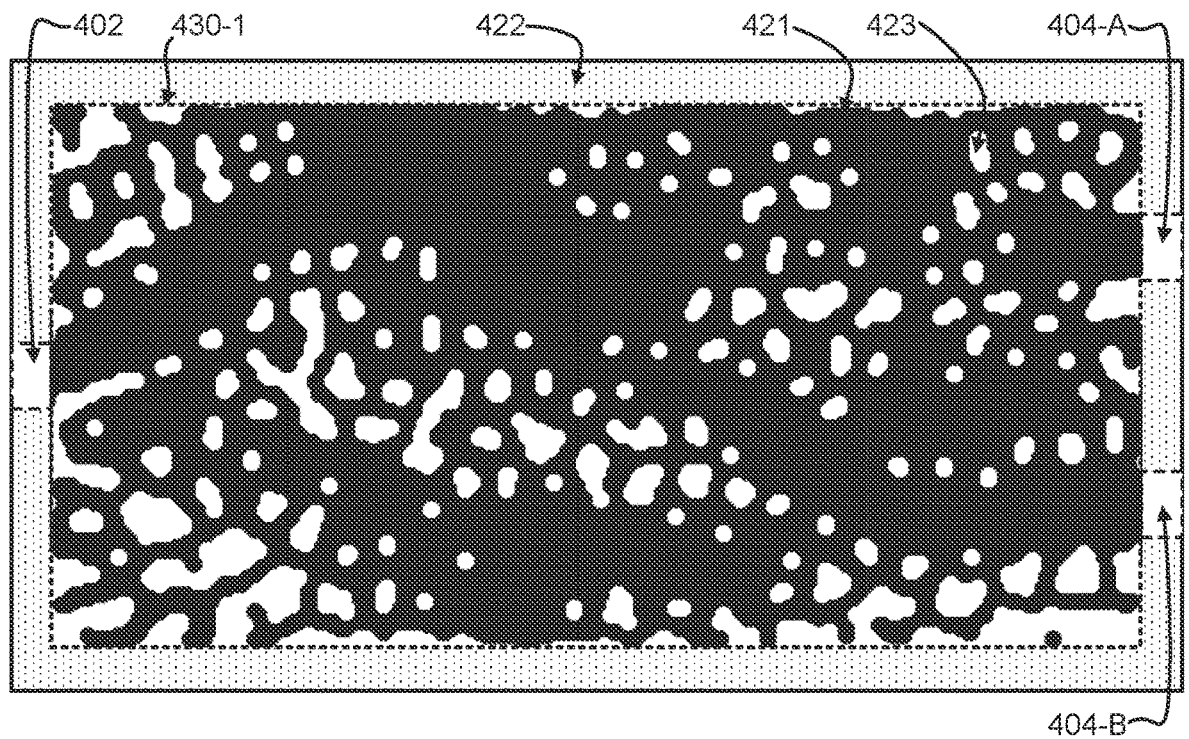
FIG. 4A illustrates an example metastructured dispersive region structured to demultiplex an input signal, in accordance with embodiments of the present disclosure.
Figure 4B:
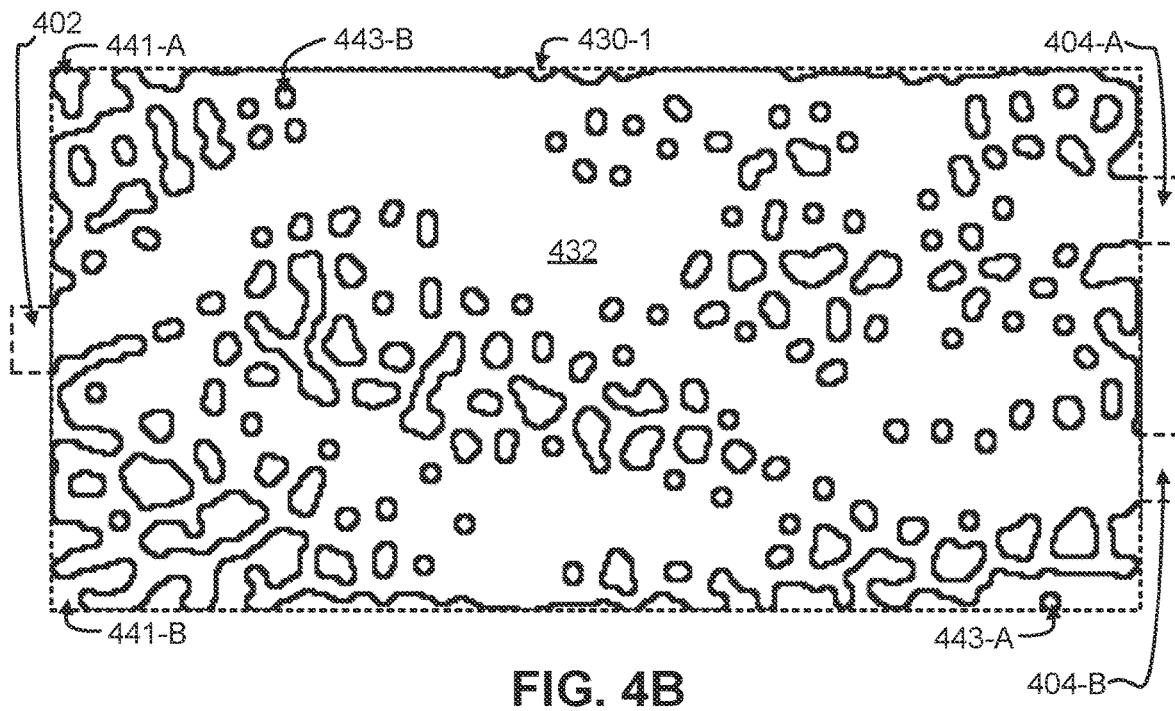
FIG. 4B illustrates an interface pattern formed by the metastructured dispersive region, in accordance with embodiments of the present disclosure.

As described in more detail in reference to FIGS. 3D and 4A-4B, the shape and arrangement of the first and second material create a plurality of interfaces that collectively form a material interface pattern that is at least partially surrounded by a periphery boundary region 322 that includes the second material. In some embodiments periphery region 322 has a substantially homogeneous composition that includes the second material. In the illustrated embodiment, dispersive region 330 includes a first side 331 and a second side 333 that each interface with an inner boundary (i.e., the unlabeled dashed line of periphery region 322 disposed between dispersive region 330 and dashed-dotted line corresponding to an outer boundary of periphery region 322). First side 331 and second side 333 correspond to opposite sides of dispersive region 330. Input region 310 is disposed proximate to first side 331 (e.g., one side of input region 310 abuts first side 331 of dispersive region 330) while each of the plurality of output regions 312 are disposed proximate to second side 333 (e.g., one side of each of the plurality of output regions 312 abuts second side 333 of dispersive region 330).

As described in more detail in reference to FIG. 2B, the demultiplexer 320 may be structured to reflect a channel of the input signal (e.g., optical signal 110). As such, the demultiplexer 320 may include an output region 312 (e.g., output region 312-A) disposed proximal to first side 331 (e.g., on the same side as input region 310) rather than disposed proximal to second side 333. In this way, the dispersive region 330 may be structured to reflect an output channel and to transmit a throughput signal, rather than transmitting both the output channel and the throughput signal through the second side 333.

In the illustrated embodiment each of the plurality of output regions 312 are parallel to each other one of the plurality of output regions 312. However, in other embodiments the plurality of output regions 312 may not be parallel to one another or even disposed on the same side (e.g., one or more of the plurality of output regions 312 and/or input region 310 may be disposed proximate to sides of dispersive region 330 that are adjacent to first side 331 and/or second side 333). In some embodiments adjacent output regions 312 are separated by a common separation distance 314. In some embodiments, first output region 312-A is separated from second output region 312-B by a separation distance 314 corresponding to less than 50 µm, less than 30 µm, less than 10 µm, less than 5 µm, less than 2 µm, approximately 1.1 µm, or otherwise.

As illustrated in the embodiment of FIG. 3A, dispersive region 330 of demultiplexer 320 is optically coupled to exactly two output regions 312 (e.g., 312-A and 312-B) that are each respectively mapped (i.e., by virtue of the structure of dispersive region 330) to a respective one of the channels included in a plurality of distinct wavelength channels (e.g., a first distinct wavelength channel may be mapped to first output region 312-A and a first throughput signal may be mapped to second output region 312-B).

It is noted that the first material and second material of dispersive region 330 are arranged and shaped within the dispersive region such that the material interface pattern is substantially proportional to a design obtainable with an inverse design process. More specifically, in some embodiments, the inverse design process may include iterative optimization (e.g., gradient based or otherwise) of a design based at least in part on a loss function that incorporates a performance loss (e.g., to enforce functionality) and a fabrication loss (e.g., to enforce fabricability and binarization of a first material and a second material) that is collectively reduced or otherwise adjusted iteratively until a design within target specifications that is also manufacturable is obtained. In some embodiments, other optimization techniques may be used instead of, or jointly with, gradient-based optimization. Advantageously, this allows for optimization of a near unlimited number of design parameters to achieve functionality and performance within a predetermined area that may not have been possible with conventional design techniques.

For example, In some embodiments dispersive region 330 is structured to optically separate a channel from a multi-channel optical signal within a predetermined area of less than 100 µm×100 µm, less than 35 µm×35 µm, or otherwise when the input region 310 receives the multi-channel optical signal. In some embodiments, the predetermined area is greater than 3 µm×3 µm. In some embodiments, width 325 of dispersive region 330 may be less than 100 µm, less than 50 µm, less than 35 µm, less than 20 µm, less than 10 µm, less than 5 µm, approximately 3.2 µm, or otherwise. In some embodiments, length 327 of dispersive region 330 may be less than 100 µm, less than 50 µm, less than 35 µm, less than 10 µm, approximately 6.4 µm, or otherwise. As illustrated, dispersive region 330 has a square area of width 325 substantially equal to length 327. However, in other embodiments, dispersive region 330 may have different lengths and widths (e.g., rectangular, octagonal, circular, ovoidal, or otherwise). For example, In some embodiments, dispersive region 330 may be a width 325 of 3.2 µm and a length 327 of 6.4 µm. In some embodiments, the input region 310 and the output regions 312 may have a common width (e.g., parallel to the direction of width 325) that may correspond to less than 1 µm, less than 0.5 µm, approximately 0.4 µm, or otherwise.

In some embodiments, the dispersive region 330 is structured to accommodate a common bandwidth for each of the two distinct wavelength channels, each having different center wavelengths. In some embodiments the common bandwidth is approximately 13 nm wide and the different center wavelengths is selected from a group consisting of 1271 nm, 1291 nm, 1311 nm, 1331 nm, 1511 nm, 1531 nm, 1551 nm, and 1571 nm. In some embodiments, the entire structure of demultiplexer 320 (e.g., including input region 321, periphery region 322, dispersive region 330, and plurality of output regions 312) fits within a predetermined area (e.g., as defined by width 321 and length 323). In some embodiments the predetermined area less than or equal to 100 µm×100 µm, less than or equal to 35 µm×35 µm, or otherwise. Dispersive region 330 and/or demultiplexer 320 may fit within other areas greater than or less than 100 µm×100 µm, 35 µm×35 µm, or otherwise, which may result in changes to the structure of dispersive region 330 (e.g., the distribution and shape of the first material and second material) and/or other components of demultiplexer 320.

In some embodiments, the dispersive region 330 is structured to have a power transmission of −2 dB or greater from the input region 310, through the dispersive region 330, and to a corresponding one of the plurality of output regions 312 for a given wavelength within the distinct wavelength channel mapped to the corresponding one of the plurality of output regions 312. For example, if channel 1 of a multichannel optical signal is mapped to output region 312-A, then when demultiplexer 320 receives the multi-channel optical signal at input region 310, the dispersive region 330 will optically separate channel 1 from the multi-channel optical signal and guide a portion of the multi-channel optical signal corresponding to channel 1 to the first output region 312-A with a power transmission of −2 dB or greater.

In some embodiments, dispersive region 330 is structured such that an adverse power transmission (i.e., isolation) for the given wavelength from the input region 310 to any of the plurality of output regions other than the corresponding one of the plurality of output regions 312 is −30 dB or less, −22 dB or less, or otherwise. For example, if channel 1 of a multi-channel optical signal is mapped to output region 312-A, then the adverse power transmission from input region 310 to any other one of the plurality of output regions (e.g., second output region 312-B) other than the corresponding one of the plurality of output regions (e.g., 312-A) is −30 dB or less, −22 dB or less, or otherwise. In some embodiments, a maximum power reflection from demultiplexer 320 of an input signal (e.g., a multi-channel optical signal) received at an input region (e.g., input region 310) is reflected back to the input region by dispersive region 330 or other components of demultiplexer 320 is −40 dB or less, −20 dB or less, −8 dB or less, or otherwise. It is appreciated that in other embodiments the power transmission, adverse power transmission, maximum power, or other performance characteristics may be different than the respective values discussed herein, but the structure of dispersive region 330 may change due to the intrinsic relationship between structure, functionality, and performance of demultiplexer 320.

FIGS. 3B-3D illustrate cross sectional views of the example photonic demultiplexer 320 in a multilayer structure, in accordance with embodiments of the present disclosure. It is appreciated that the illustrated embodiment is not exhaustive and that certain features or elements may be omitted to avoid obscuring certain aspects of the invention. In the illustrated embodiment, demultiplexer 320 includes substrate 302, dielectric layer 304, active layer 306 (e.g., as shown in the cross-sectional illustration of FIG. 3A), and a cladding layer 308. In some embodiments, demultiplexer 320 may be, in part or otherwise, a photonic integrated circuit or silicon photonic device that is compatible with conventional fabrication techniques (e.g., lithographic techniques such as photolithographic, electron-beam lithography and the like, sputtering, thermal evaporation, physical and chemical vapor deposition, and the like).

In some embodiments a silicon on insulator (SOI) wafer may be provided that includes sequentially stacked layers including a support substrate (e.g., a silicon substrate), a silicon dioxide layer, a silicon layer (e.g., doped silicon, undoped silicon, or otherwise). The support substrate of the SOI wafer may correspond to substrate 302. The silicon dioxide layer of the SOI wafer may correspond to dielectric layer 304. The silicon layer of the SOI wafer may be selectively etched by lithographically creating a pattern on the SOI wafer (e.g., directly on top of the silicon layer) that is transferred to the SOI wafer via a dry etch process (e.g., via a photoresist mask or any other mask) to remove portions of the silicon layer. The etched portions of the silicon layer included in the SOI wafer may subsequently by backfilled with silicon dioxide and planarized to form a patterned layer of silicon and silicon dioxide, which may collectively correspond to active layer 306. An oxide layer (e.g., silicon dioxide or otherwise) may be grown, deposited, or otherwise provided on top of the etched/backfilled silicon layer of the SOI wafer, which may correspond to cladding layer 308. It is appreciated that during the etch process, the silicon within active layer 306 may be selectively etched all the way down to dielectric layer 304 to form voids that may subsequently be backfilled with silicon dioxide, planarized, and then further encapsulated with silicon dioxide to form cladding layer 308. In some embodiments, formation of active layer 306 may include several etch depths including a full etch depth of the silicon to obtain the targeted structure. In some embodiments, the silicon may be 220 nm thick and thus the full etch depth may be 220 nm. In some embodiments, forming demultiplexer 320 may include a two-step encapsulation process in which two silicon dioxide depositions are performed with an intermediate chemical mechanical planarization used to yield a planar surface of active layer 306.

FIG. 3C illustrates a more detailed view of active layer 306 (relative to FIG. 3B) taken along a portion of periphery region 322 that includes input region 310 of FIG. 3A. In the illustrated embodiment, active region 306 includes a first material 332 with a refractive index of $\varepsilon_1$ and a second material 334 with a refractive index of $\varepsilon_2$ that is different from $\varepsilon_1$. Homogenous regions of the first material 332 and the second material 334 may form waveguides or portions of waveguides that correspond to input region 310 and plurality of output regions 312 as illustrated in FIGS. 3A and 3C.

FIG. 3D illustrates a more detailed view of active layer 306 (relative to FIG. 3B) taken along dispersive region 330. As described previously, dispersive region 306 includes a first material 332 (e.g., silicon) and a second material 334 (e.g., silicon dioxide) that are heterogeneously distributed to form a plurality of interfaces 336 that collectively form a material interface pattern. Each of the plurality of interfaces 336 that form the interface pattern correspond to a change in refractive index of dispersive region 330 to structure the dispersive region (i.e., the shape and arrangement of first material 332 and second material 334) to provide, at least in part, the functionality of demultiplexer 320 (i.e., optical separation of the plurality of distinct wavelength channels from the multi-channel optical signal and respective guidance of each of the plurality of distinct wavelength channels to a corresponding one of the plurality of output regions 312 when the input region 310 receives the multi-channel optical signal).

It is appreciated that in the illustrated embodiments of demultiplexer 320 as shown in FIGS. 3A-3D, the change in refractive index is shown as being vertically consistent (i.e., the first material 332 and second material 334 form interfaces that are substantially vertical or perpendicular to a lateral plane or cross-section of demultiplexer 320. However, in some embodiments, the plurality of interfaces (e.g., interfaces 336 illustrated in FIG. 3D) may not be substantially perpendicular with the lateral plane or cross-section of demultiplexer 320.

FIGS. 4A-4B illustrate more detailed cross-sectional views of dispersive region 430 within an active layer (e.g., active layer 306 of FIG. 3B) included in a photonic demultiplexer 420 and the corresponding material interface pattern within the dispersive region 430 formed by the arrangement of a first material 421 (e.g., black colored regions within dispersive region 430 that may correspond to silicon) and a second material 423 (e.g., white colored regions within dispersive region 430 that may correspond to silicon dioxide). Demultiplexer 420 is a two-channel demultiplexer including dispersive region 430 that is not structured to demultiplex optical signals outside of two distinct wavelength channels. Demultiplexer 420 includes an input region 402, a plurality of output regions 404 (e.g., two output regions included a first output region 404-A and a second output region 404-B), the dispersive region 430 (e.g., with a design corresponding to any one of the designs included in dispersive region 430-1, 430-2, 430-3, 430-4, 430-5, 430-6, or any design generated by the inverse design method described in the present disclosure). The dispersive region 430 is optically disposed between input region 402 and the plurality of output regions 404. The dispersive region 430 is surrounded, at least in part, by a peripheral region 422 (e.g., silicon dioxide or otherwise). It is appreciated that like named or labeled elements of demultiplexer 420 may similarly correspond to like named or labeled elements of other demultiplexers described in embodiments of the present disclosure. The structure within the dispersive region 430 of the various embodiments illustrated in FIGS. 4A-4B may include protrusions, islands, dendritic shapes, or other shapes and structures as illustrated. It is appreciated that in other embodiments there may be no protrusions, there may be no islands, there may be no dendritic structures, or there may be any number, including zero, of protrusions, islands of any material included in the dispersive region 430, dendritic structures, or a combination thereof. Accordingly, the structure of dispersive region 430 illustrated by FIGS. 4A-4B may be incorporated is any one of the demultiplexers described in the various embodiments of the disclosure (e.g., mux/demux 109 of FIG. 1, demultiplexer 220-1 of FIG. 2A, demultiplexer 320 of FIG. 3A, and the like).

The structure within the dispersive region 430 are designs obtained from an inverse design process that utilizes iterative optimization (e.g., gradient-based optimization, Markov Chain Monte Carlo optimization, or other optimization techniques) combined with first principles simulations of the underlying physics governing the photonic device to generate a design that is substantially replicated by dispersive region 430 within a proportional or scaled manner such that photonic demultiplexer 420 provides the targeted functionality (e.g., optically separates distinct wavelength channels from a multi-channel optical signal and guides said distinct wavelength channels to a corresponding one of a plurality of output regions to demultiplex the multi-channel optical signal). The inverse design process may include a fabrication loss that enforces a minimum feature size, for example, to ensure fabricability of the design. In the embodiments of dispersive region 430 illustrated in FIGS. 4A-4B, the material interface pattern (e.g., 432, 434, 436, 438, 440, and 442) formed by the first material 421 and the second material 423 is shaped to enforce the minimum feature size with a specified shape. In some embodiments, interfaces formed by the first material 421 and the second material 423 may be shaped such that a radius of curvature defining any given radius of a material interface within the dispersive region 430 has a magnitude of less than a threshold size. For example, if the minimum feature size is 150 nm, the radius of curvature for any of the plurality of interfaces have a magnitude of less than the threshold size, which corresponds the inverse of half the minimum feature size (i.e., 1/75 nm$^{-1}$). In other embodiments, the minimum feature size may include a minimum feature shape (e.g., a square, circle, hexagon, octagon, or any other shape) having a width corresponding to the minimum feature size (e.g., 100 nm, 140 nm, 150 nm, 180 nm, or otherwise). Thus, any portion of the first material 421 and the second material 423 may be structured within the dispersive region 430 such that the minimum feature shape (e.g., an octagon) with a width of the minimum feature size may be used to form (e.g., draw, paint, or otherwise construct a design representative of the structure) the dispersive region 430. Enforcement of such a minimum feature size and/or shape prevents the inverse design process from generating designs that are not fabricable by considering manufacturing constraints, limitations, and/or yield. In some embodiments, different or additional checks on metrics related to fabricability may be utilized to enforce a minimum width or spacing as a minimum feature size.

FIG. 4A illustrates a cross-sectional view of dispersive region 430-1 for photonic demultiplexer 420, in accordance with embodiments of the present disclosure. FIG. 4B illustrates a material interface pattern 432 formed within dispersive region 430-1 based on the shape and arrangement of the first material (e.g., black colored regions within dispersive region 430-1) and the second material (e.g., white colored regions within dispersive region 430-1). Dispersive region 430-1 is structured such that the two output regions (e.g., 404-A and 404-B) are respectively mapped to a wavelength channel and to a throughput signal. Specifically, one of the two output region 404-A is mapped to a distinct wavelength channel having a center wavelength of 1271 nm while the other output region 404-B is mapped to a throughput signal including additional wavelength channels (e.g., a channel having a center wavelength of 1291 nm).

As illustrated in FIG. 4B material interface pattern 432, which is defined by the black lines within dispersive region 430-1 and corresponds to a change in refractive index within dispersive region 430-1, includes a plurality of protrusions 441. A first protrusion 441-A is formed of the first material 421 and extends from periphery region 422 into dispersive region 430-1. Similarly, a second protrusion 441-B is formed of the second material 423 and extends from periphery region 422 into dispersive region 430-1. Further illustrated in FIG. 4B, dispersive region 430-1 includes a plurality of islands 444 formed of either the first material 432 or the second material 434. The plurality islands 443 include a first island 443-A that is formed of the first material 421 and is surrounded by the second material 423. The plurality of islands 443 also includes a second island 443-B that is formed of the second material 423 and is surrounded by the first material 421. In some embodiments, the islands may have a shape corresponding to the shape of the minimum feature size (e.g., an octagon).

FIG. 5 is a functional block diagram illustrating a system 500 for generating a design of a photonic device, in accordance with an embodiment of the disclosure. System 500 may be utilized to perform the inverse design process. More specifically, system 500 is a design tool that may be utilized to optimize structural parameters (e.g., shape and arrangement of a first material and a second material within the dispersive region of the embodiments described in the present disclosure) of photonic integrated circuits based on first-principles simulations (e.g., electromagnetic simulations to determine a field response of the photonic device to an excitation source) and iterative optimization. In other words, system 500 may provide a design obtained via the inverse design process that is substantially replicated (i.e., proportionally scaled) by dispersive regions 330 and 430 of demultiplexers 320 and 420 illustrated in FIGS. 3A and 4A-4B.

As illustrated, system 500 includes controller 505, display 507, input device(s) 509, communication device(s) 511, network 513, remote resources 515, bus 521, and bus 523. Controller 505 includes processor 531, memory 533, local storage 535, and photonic device simulator 539. Photonic device simulator 539 includes operational simulation engine 541, fabrication loss calculation logic 543, calculation logic 545, adjoint simulation engine 547, and optimization engine 549. It is appreciated that in some embodiments, controller 505 may be a distributed system.

Controller 505 is coupled to display 507 (e.g., a light emitting diode display, a liquid crystal display, and the like) coupled to bus 521 through bus 523 for displaying information to a user utilizing system 500 to optimize structural parameters of the photonic device (i.e., demultiplexer). Input device 509 is coupled to bus 521 through bus 523 for communicating information and command selections to processor 531. Input device 509 may include a mouse, trackball, keyboard, stylus, or other computer peripheral, to facilitate an interaction between the user and controller 505. In response, controller 505 may provide verification of the interaction through display 507.

Another device, which may optionally be coupled to controller 505, is a communication device 511 for accessing remote resources 515 of a distributed system via network 513. Communication device 511 may include any of a number of networking peripheral devices such as those used for coupling to an Ethernet, Internet, or wide area network, and the like. Communication device 511 may further include a mechanism that provides connectivity between controller 505 and the outside world. Note that any or all of the components of system 500 illustrated in FIG. 5 and associated hardware may be used in various embodiments of the present disclosure. The remote resources 515 may be part of a distributed system and include any number of processors, memory, and other resources for optimizing the structural parameters of the photonic device.

Controller 505 orchestrates operation of system 500 for optimizing structural parameters of the photonic device. Processor 531 (e.g., one or more central processing units, graphics processing units, and/or tensor processing units, etc.), memory 533 (e.g., volatile memory such as DRAM and SRAM, non-volatile memory such as ROM, flash memory, and the like), local storage 535 (e.g., magnetic memory such as computer disk drives), and the photonic device simulator 539 are coupled to each other through bus 523. Controller 505 includes software (e.g., instructions included in memory 533 coupled to processor 531) and/or hardware logic (e.g., application specific integrated circuits, field-programmable gate arrays, and the like) that when executed by controller 505 causes controller 505 or system 500 to perform operations. The operations may be based on instructions stored within any one of, or a combination of, memory 533, local storage 535, physical device simulator 539, and remote resources 515 accessed through network 513.

In the illustrated embodiment, modules 541-549 of photonic device simulator 539 are utilized to optimize structural parameters of the photonic device (e.g., mux/demux 107 of FIG. 1, demultiplexer 220 of FIG. 2A, demultiplexer 250 of FIG. 2B, demultiplexer 320 of FIGS. 3A-3D, and demultiplexer 420 of FIGS. 4A-4B). In some embodiments, system 500 may optimize the structural parameters of the photonic device as part of a cascaded arrangement via, inter alia, simulations (e.g., operational and adjoint simulations) that utilize a finite-difference time-domain (FDTD) method to model the field response (e.g., electric and magnetic fields within the photonic device). The operational simulation engine 541 provides instructions for performing an electromagnetic simulation of the photonic device operating in response to an excitation source within a simulated environment. In particular, the operational simulation determines a field response of the simulated environment (and thus the photonic device, which is described by the simulated environment) in response to the excitation source for determining a performance metric of the physical device (e.g., based off an initial description or input design of the photonic device that describes the structural parameters of the photonic device within the simulated environment with a plurality of voxels).

The structural parameters may correspond, for example, to the specific design, material compositions, dimensions, and the like of the physical device. Fabrication loss calculation logic 543 provides instructions for determining a fabrication loss, which is utilized to enforce a minimum feature size and/or shape to ensure fabricability. In some embodiments, the fabrication loss is also used to enforce binarization of the design (i.e., such that the photonic device includes a first material and a second material that are interspersed to form a plurality of interfaces). Calculation logic 545 computes a loss metric determined via a loss function that incorporates a performance loss, based on the performance metric, and the fabrication loss. Adjoint simulation engine 547 is utilized in conjunction with the operational simulation engine 541 to perform an adjoint simulation of the photonic device to backpropagate the loss metric through the simulated environment via the loss function to determine how changes in the structural parameters of the photonic device influence the loss metric. Optimization engine 549 is utilized to update the structural parameters of the photonic device to reduce the loss metric and generate a revised description (i.e., revising the design) of the photonic device.

Figure 6A:
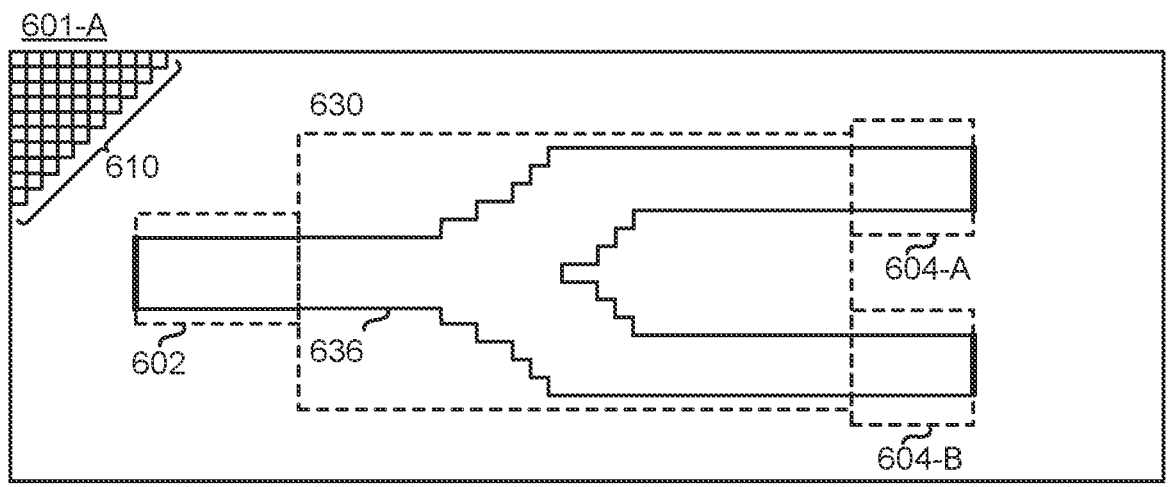
FIG. 6A illustrates a demonstrative simulated environment describing a photonic integrated circuit, in accordance with embodiments of the present disclosure.
Figure 6B:
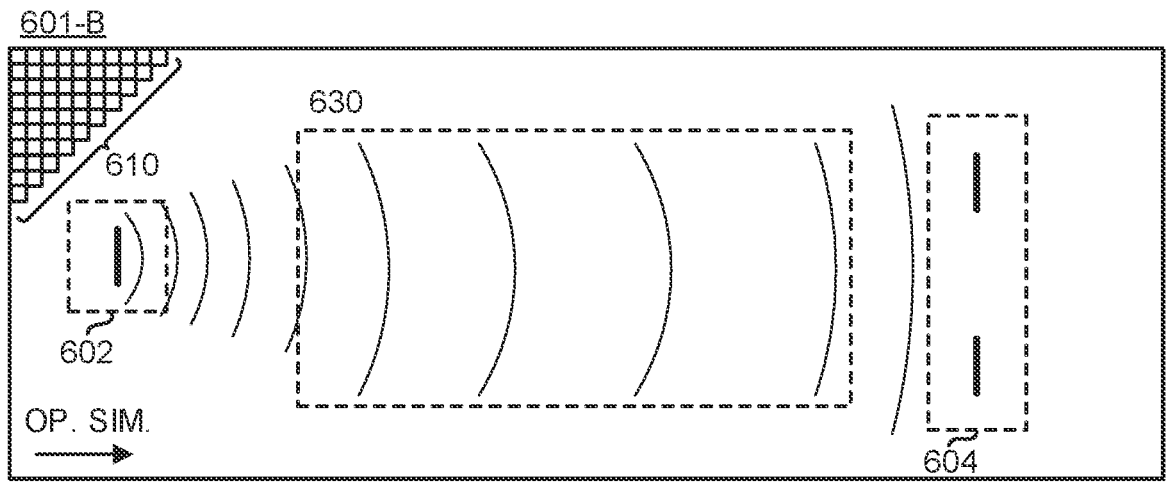
FIG. 6B illustrates an example operational simulation of a photonic integrated circuit, in accordance with embodiments of the present disclosure.
Figure 6C:
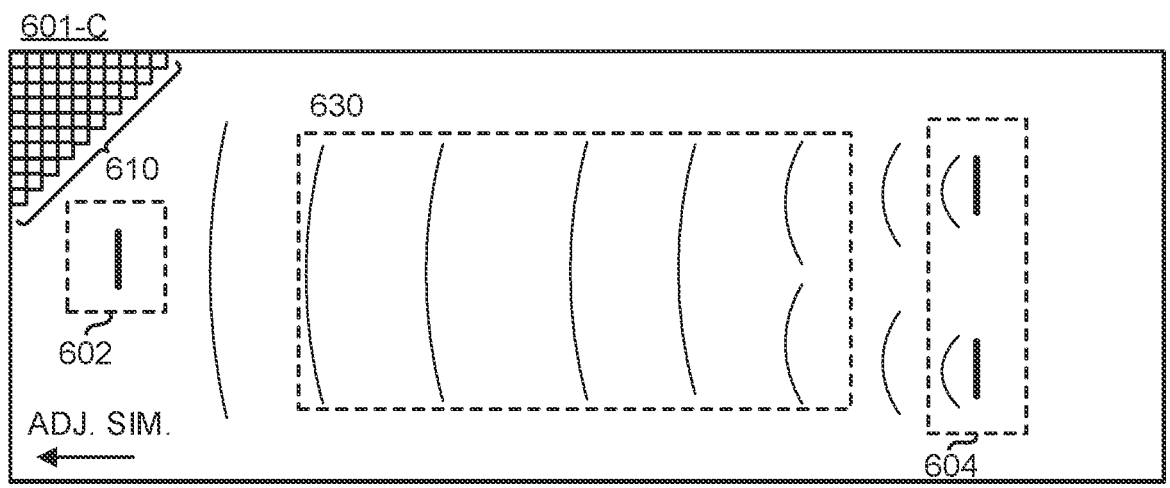
FIG. 6C illustrates an example adjoint simulation within the simulated environment by backpropagating a loss value, in accordance with embodiments of the present disclosure.

FIGS. 6A-6C respectively illustrate an initial set up of a simulated environment 601-A describing a photonic device, performing an operational simulation of the photonic device in response to an excitation source within the simulated environment 601-B, and performing an adjoint simulation of the photonic device within the simulated environment 601-C. The simulated environment 601-A is understood to describe a photonic device included as part of a cascaded arrangement of multiple photonic devices in a photonic integrated circuit. In this way, FIGS. 6A-6C describe the individual tuning of one or more of the photonic devices making up a cascade mux/demux (e.g., cascade mux/demux 109 of FIG. 1, photonic integrated circuit 200 of FIG. 2A, etc.).

The initial set up of the simulated environment 601, 1-dimensional representation of the simulated environment 601, operational simulation of the physical device, and adjoint simulation of the physical device may be implemented with system 100 illustrated in FIG. 1. As illustrated in FIGS. 6A-6C, simulated environment 601 is represented in two-dimensions. However, it is appreciated that other dimensionality (e.g., 3-dimensional space) may also be used to describe simulated environment 601 and the photonic device. In some embodiments, optimization of structural parameters of the photonic device illustrated in FIGS. 6A-6C may be achieved via an inverse design process including, inter alia, simulations (e.g., operational simulations and adjoint simulations) that utilize a finite-difference time-domain (FDTD) method to model the field response (e.g., electric and magnetic field) to an excitation source.

FIG. 6A illustrates a demonstrative simulated environment 601-A describing an photonic device of a photonic integrated circuit (e.g., a photonic device such as a waveguide, demultiplexer, and the like), in accordance with embodiments of the present disclosure. More specifically, in response to receiving an initial description of a photonic device defined by one or more structural parameters (e.g., an input design), a system (e.g., system 500 of FIG. 5) configures a simulated environment 601 to be representative of the photonic device. As illustrated, the simulated environment 601 (and subsequently the photonic device) is described by a plurality of voxels 610, which represent individual elements (i.e., discretized) of the two-dimensional (or other dimensionality) space. Each of the voxels is illustrated as two-dimensional squares; however, it is appreciated that the voxels may be represented as cubes or other shapes in three-dimensional space. It is appreciated that the specific shape and dimensionality of the plurality of voxels 610 may be adjusted dependent on the simulated environment 601 and photonic device being simulated. It is further noted that only a portion of the plurality of voxels 610 are illustrated to avoid obscuring other aspects of the simulated environment 601.

Each of the plurality of voxels 610 may be associated with a structural value, a field value, and a source value. Collectively, the structural values of the simulated environment 601 describe the structural parameters of the photonic device. In some embodiments, the structural values may correspond to a relative permittivity, permeability, and/or refractive index that collectively describe structural (i.e., material) boundaries or interfaces of the photonic device (e.g., interface pattern 431 of FIG. 4B). For example, an interface 636 is representative of where relative permittivity changes within the simulated environment 601 and may define a boundary of the photonic device where a first material meets or otherwise interfaces with a second material. The field value describes the field (or loss) response that is calculated (e.g., via Maxwell's equations) in response to an excitation source described by the source value. The field response, for example, may correspond to a vector describing the electric and/or magnetic fields (e.g., in one or more orthogonal directions) at a particular time step for each of the plurality of voxels 610. Thus, the field response may be based, at least in part, on the structural parameters of the photonic device and the excitation source.

In the illustrated embodiment, the photonic device corresponds to an optical demultiplexer having a design region 630 (e.g., corresponding to dispersive region 330 of FIG. 3A, and/or dispersive region 430 of FIG. 4A-4B), in which structural parameters of the physical device may be updated or otherwise revised. It is appreciated that the complexity of optimizing the design of the photonic device is based, at least in part, on a target size. Specifically, through an inverse design process, iterative optimization (e.g. gradient-based optimization, Markov Chain Monte Carlo optimization, or other optimization techniques) of a loss metric determined from a loss function is performed to generate a design of the photonic device that functionally causes a multi-channel optical signal to be demultiplexed and guided from input port 602 to a corresponding one of the output ports 604. Thus, input port 602 (e.g., corresponding to input region 310 of FIG. 3A, input region 402 of FIG. 4A, and the like) of the photonic device corresponds to a location of an excitation source to provide an output (e.g., a Gaussian pulse, a wave, a waveguide mode response, and the like). The output of the excitation source interacts with the photonic device based on the structural parameters (e.g., an electromagnetic wave corresponding to the excitation source may be perturbed, retransmitted, attenuated, refracted, reflected, diffracted, scattered, absorbed, dispersed, amplified, or otherwise as the wave propagates through the photonic device within simulated environment 601). In other words, the excitation source may cause the field response of the photonic device to change, which is dependent on the underlying physics governing the physical domain and the structural parameters of the photonic device. The excitation source originates or is otherwise proximate to input port 602 and is positioned to propagate (or otherwise influence the field values of the plurality of voxels) through the design region 630 towards output ports 604 of the photonic device. In the illustrated embodiment, the input port 602 and output ports 604 are positioned outside of the design region 630. In other words, in the illustrated embodiment, only a portion of the structural parameters of the photonic device is optimizable.

However, in other embodiments, the entirety of the photonic device may be placed within the design region 630 such that the structural parameters may represent any portion or the entirety of the design of the photonic device. The electric and magnetic fields within the simulated environment 601 (and subsequently the photonic device) may change (e.g., represented by field values of the individual voxels that collectively correspond to the field response of the simulated environment) in response to the excitation source. The output ports 604 of the demultiplexer may be used for determining a performance metric of the photonic device in response to the excitation source (e.g., power transmission from input port 602 to a specific one of the output ports 604.). The initial description of the photonic device, including initial structural parameters, excitation source, performance parameters or metrics, and other parameters describing the photonic device, are received by the system (e.g., system 500 of FIG. 5) and used to configure the simulated environment 601 for performing a first-principles based simulation of the photonic device. These specific values and parameters may be defined directly by a user (e.g., of system 500 in FIG. 5), indirectly (e.g., via controller 505 culling pre-determined values stored in memory 533, local storage 535, or remote resources 515), or a combination thereof.

FIG. 6B illustrates an operational simulation of the photonic device in response to an excitation source within simulated environment 601-B, in accordance with embodiments of the present disclosure. In the illustrated embodiment, the photonic device is an optical demultiplexer structured to optically separate each of a plurality of distinct wavelength channels included in a multi-channel optical signal received at input port 602 and respectively guide each of the plurality of distinct wavelength channels to a corresponding one of the plurality of output regions 604. The excitation source may be selected (randomly or otherwise) from the plurality of distinct wavelength channels and originates at input region 602 having a specified spatial, phase, and/or temporal profile. The operational simulation occurs over a plurality of time steps, including the illustrated time step. When performing the operational simulation, changes to the field response (e.g., the field value) for each of the plurality of voxels 610 are incrementally updated in response to the excitation source over the plurality of time steps. The changes in the field response at a particular time step are based, at least in part, on the structural parameters, the excitation source, and the field response of the simulated environment 601 at the immediately prior time step included in the plurality of time steps. Similarly, in some embodiments the source value of the plurality of voxels 610 is updated (e.g., based on the spatial profile and/or temporal profile describing the excitation source). It is appreciated that the operational simulation is incremental and that the field values (and source values) of the simulated environment 601 are updated incrementally at each time step as time moves forward for each of the plurality of time steps during the operational simulation. It is further noted that in some embodiments, the update is an iterative process and that the update of each field and source value is based, at least in part, on the previous update of each field and source value.

Once the operational simulation reaches a steady state (e.g., changes to the field values in response to the excitation source substantially stabilize or reduce to negligible values) or otherwise concludes, one or more performance metrics may be determined. In some embodiments, the performance metric corresponds to the power transmission at a corresponding one of the output ports 604 mapped to the distinct wavelength channel being simulated by the excitation source. In other words, in some embodiments, the performance metric represents power (at one or more frequencies of interest) in the target mode shape at the specific locations of the output ports 604. In some embodiments, the performance metric may correspond to isolation in which power at each of the plurality of output ports 604 is determined. A loss value or metric of the input design (e.g., the initial design and/or any refined design in which the structural parameters have been updated) based, at least in part, on the performance metric may be determined via a loss function. The loss metric, in conjunction with an adjoint simulation, may be utilized to determine a structural gradient (e.g., influence of structural parameters on loss metric) for updating or otherwise revising the structural parameters to reduce the loss metric (i.e. increase the performance metric). It is noted that the loss metric is further based on a fabrication loss value used to enforce a minimum feature size of the photonic device to promote fabricability of the device.

FIG. 6C illustrates an example adjoint simulation within simulated environment 601-C by backpropagating a loss metric, in accordance with embodiments of the present disclosure. More specifically, the adjoint simulation is a time-backwards simulation in which a loss metric is treated as an excitation source that interacts with the photonic device and causes a loss response. In other words, an adjoint (or virtual source) based on the loss metric is placed at the output region (e.g., output ports 604) or other location that corresponds to a location used when determining the performance metric. The adjoint source(s) is then treated as a physical stimulus or an excitation source during the adjoint simulation. A loss response of the simulated environment 601 is computed for each of the plurality of time steps (e.g., backwards in time) in response to the adjoint source. The loss response collectively refers to loss values of the plurality of voxels that are incrementally updated in response to the adjoint source over the plurality of time steps. The change in loss response based on the loss metric may correspond to a loss gradient, which is indicative of how changes in the field response of the physical device influence the loss metric. The loss gradient and the field gradient may be combined in the appropriate way to determine a structural gradient of the photonic device/simulated environment (e.g., how changes in the structural parameters of the photonic device within the simulated environment influence the loss metric). Once the structural gradient of a particular cycle (e.g., operational and adjoint simulation) is known, the structural parameters may be updated to reduce the loss metric and generate a revised description or design of the photonic device.

In some embodiments, iterative cycles of performing the operational simulation, and adjoint simulation, determining the structural gradient, and updating the structural parameters to reduce the loss metric are performed successively as part of an inverse design process that utilizes iterative gradient-based optimization. An optimization scheme such as gradient descent may be utilized to determine specific amounts or degrees of changes to the structural parameters of the photonic device to incrementally reduce the loss metric. More specifically, after each cycle the structural parameters are updated (e.g., optimized) to reduce or otherwise adjust the loss metric. The operational simulation, adjoint simulation, and updating the structural parameters are iteratively repeated until the loss metric substantially converges or is otherwise below or within a threshold value or range such that the photonic device provides the desired performed while maintaining fabricability.

Figure 7A:
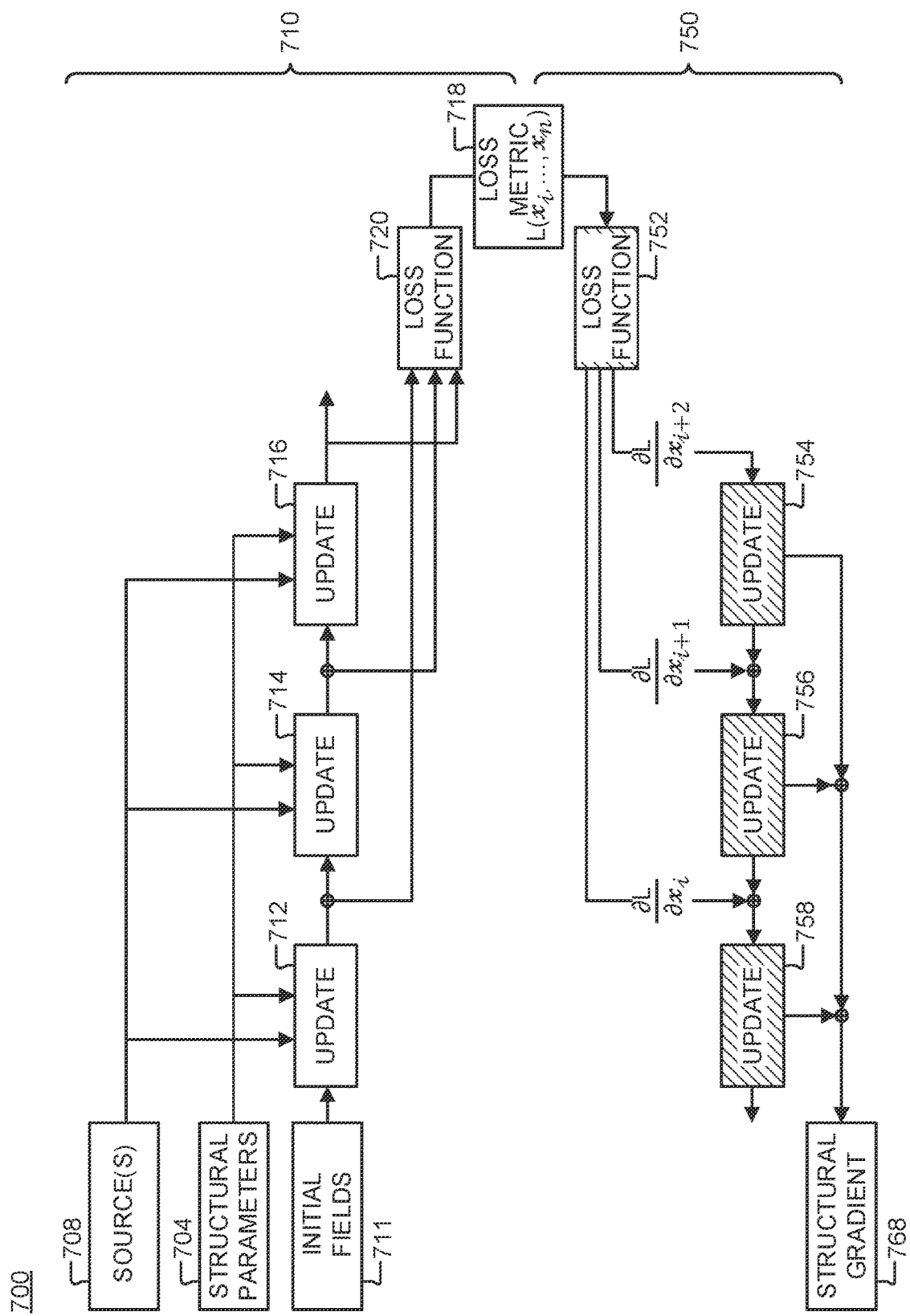
FIG. 7A is a flow chart illustrating example time steps for operational and adjoint simulations, in accordance with embodiments of the present disclosure.

FIG. 7A is a flow chart 700 illustrating example time steps for the operational simulation 710 and adjoint simulation 750, in accordance with embodiments of the present disclosure. Flow chart 700 is one possible implementation that a system (e.g., system 500 of FIG. 5) may use to perform the operational simulation 710 and adjoint simulation 750 of the simulated environment (e.g., simulated environment 601 of FIGS. 6A-6C) describing a photonic integrated circuit (e.g., an optical device operating in an electromagnetic domain such a photonic demultiplexer). In the illustrated embodiment, the operational simulation utilizes a finite-difference time-domain (FDTD) method to model the field response (both electric and magnetic) or loss response at each of a plurality of voxels (e.g., plurality of voxels 610 illustrated in FIGS. 6A-6C) for a plurality of time steps in response to physical stimuli corresponding to an excitation source and/or adjoint source.

As illustrated in FIG. 7A, the flow chart 700 includes update operations for a portion of operational simulation 710 and adjoint simulation 750. Operational simulation 710 occurs over a plurality of time-steps (e.g., from an initial time step to a final time step over a pre-determined or conditional number of time steps having a specified time step size) and models changes (e.g., from the initial field values 711) in electric and magnetic fields of a plurality of voxels describing the simulated environment and/or photonic device that collectively correspond to the field response. More specifically, update operations (e.g., 712, 714, and 716) are iterative and based on the field response, structural parameters 704, and one or more excitation sources 708. Each update operation is succeeded by another update operation, which are representative of successive steps forward in time within the plurality of time steps. For example, update operation 714 updates the field values 713 (see, e.g., FIG. 7B) based on the field response determined from the previous update operation 712, sources 708, and the structural parameters 704. Similarly, update operation 716 updates the field values 715 (see, e.g., FIG. 7B) based on the field response determined from update operation 714. In other words, at each time step of the operational simulation the field values (and thus field response) are updated based on the previous field response and structural parameters of the photonic device. Once the final time step of the operational simulation 710 is performed, the loss metric 718 may be determined (e.g., based on a pre-determined loss function 720). The loss gradients determined from block 752 may be treated as adjoint or virtual sources (e.g., physical stimuli or excitation source originating at an output region or port) which are backpropagated in reverse (from the final time step incrementally through the plurality of time steps until reaching the initial time step) to determine structural gradient 768.

In the illustrated embodiment, the FDTD solve (e.g., operational simulation 710) and backward solve (e.g., adjoint simulation 750) problem are described pictorially, from a high-level, using only "update" and "loss" operations as well as their corresponding gradient operations. The simulation is set up initially in which the structural parameters, physical stimuli (i.e., excitation source), and initial field states of the simulated environment (and photonic device) are provided (e.g., via an initial description and/or input design). As discussed previously, the field values are updated in response to the excitation source based on the structural parameters. More specifically, the update operation is given by $\phi$, where $x_i = \phi(x_i, b_i, z)$ for $i = 1, \ldots, n$. Here, $n$ corresponds to the total number of time steps (e.g., the plurality of time steps) for the operational simulation, where $x_i$ corresponds to the field response (the field value associated with the electric and magnetic fields of each of the plurality of voxels) of the simulated environment at time step $i$, $b$ corresponds to the excitation source(s) (the source value associated with the electric and magnetic fields for each of the plurality of voxels) of the simulated environment at time step $i$, and $z$ corresponds to the structural parameters describing the topology and/or material properties of the physical device (e.g., relative permittivity, index of refraction, and the like).

It is noted that using the FDTD method, the update operation may specifically be stated as:

$$\phi(x_i, b_i, z) = A(z) x_i + B(z) b_i. \quad (3)$$

That is to say the FDTD update is linear with respect to the field and source terms. Concretely, $A((z)) \in \mathbb{R}^{N \times N}$ and $B((z)) \in \mathbb{R}^{N \times N}$ are linear operators which depend on the structure parameters, $z$, and act on the fields, $x_i$, and the sources, $b_i$, respectively. Here, it is assumed that $x_i, b_i \in \mathbb{R}^N$ where N is the number of FDTD field components in the operational simulation. Additionally, the loss operation (e.g., loss function) may be given by L=f($x_i, \ldots, x_n$), which takes as input the computed fields and produces a single, real-valued scalar (e.g., the loss metric) that can be reduced and/or minimized.

In terms of revising or otherwise optimizing the structural parameters of the physical device, the relevant quantity to produce is $$\frac{dL}{dz},$$

which is used to describe the influence of changes in the structural parameters on the loss value and is denoted as the structural gradient 768 illustrated in FIG. 7A.

Figure 7B:
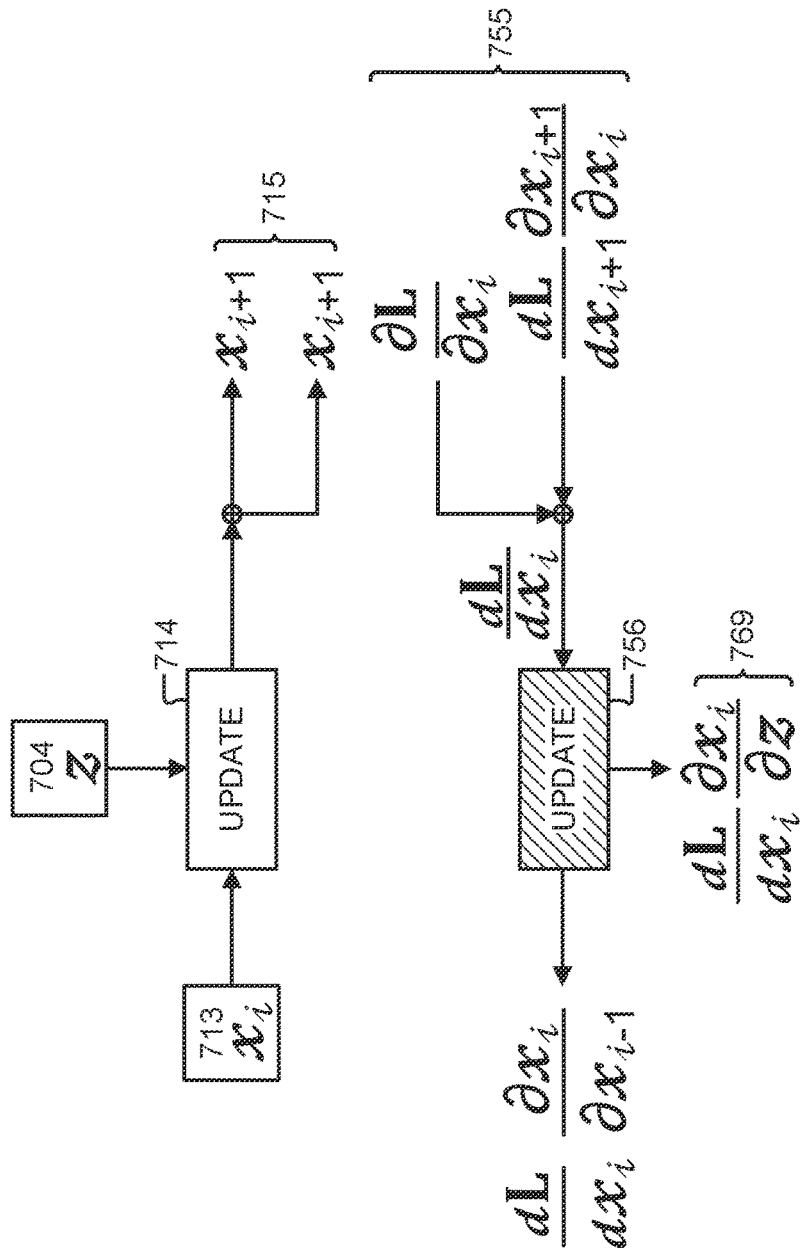
FIG. 7B is a chart illustrating a relationship between gradients determined from an operational simulation and an adjoint simulation, in accordance with embodiments of the present disclosure.

FIG. 7B is a chart 780 illustrating the relationship between the update operation for the operational simulation and the adjoint simulation (e.g., backpropagation), in accordance with embodiments of the present disclosure. More specifically, FIG. 7B summarizes the operational and adjoint simulation relationships that are involved in computing the structural gradient, $$\frac{dL}{dz},$$

which include $$\frac{\partial L}{\partial x_i}, \frac{\partial x_{i+1}}{\partial x_i}, \frac{dL}{dx_i}, \text{ and } \frac{\partial x_i}{\partial z}.$$

The update operation 714 of the operational simulation updates the field values 713, $x_i$, of the plurality of voxels at the $i$th time step to the next time step (i.e., $i+1$ time step), which correspond to the field values 715, $x_{i+1}$. The gradients 755 are utilized to determine $$\frac{dL}{dx_i}$$

for the backpropagation (e.g., update operation 356 backwards in time), which combined with the gradients 769 are used, at least in part, to calculate the structural gradient, $$\frac{dL}{dz} \cdot \frac{\partial L}{\partial x_i}$$

is the contribution of each field to the loss metric, L. It is noted that this is the partial derivative, and therefore does not take into account the causal relationship of $x_i$ $x_{i+1}$. Thus, $$\frac{\partial x_{i+1}}{\partial x_i}$$

is utilized which encompasses the $x_i \to x_{i+1}$ relationship. The loss gradient, $$\frac{dL}{dx_i}$$

may also be used to compute the structural gradient, $$\frac{dL}{dz},$$

and corresponds to the total derivative of the field with respect to loss value, L. The loss gradient, $$\frac{dL}{dx_i},$$

at a particular time step, $i$, is equal to the summation of $$\frac{\partial L}{\partial x_i} + \frac{dL}{dx_{i+1}} \frac{\partial x_{i+1}}{\partial x_i}.$$

Finally, $$\frac{\partial x_i}{\partial z},$$

which corresponds to the field gradient, is used which is the contribution to $$\frac{dL}{dz}$$

from each time/update step.

In particular, the memory footprint to directly compute $$\frac{\partial L}{\partial x_i}$$

and $$\frac{dL}{dz}$$

is so large that it is difficult to store more than a handful of state Tensors. The state Tensor corresponds to storing the values of all of the FDTD cells (e.g., the plurality of voxels) for a single simulation time step. It is appreciated that the term "tensor" may refer to tensors in a mathematical sense or as described by the TensorFlow framework developed by Alphabet, Inc. In some embodiments the term "tensor" refers to a mathematical tensor which corresponds to a multidimensional array that follows specific transformation laws. However, in most embodiments, the term "tensor" refers to TensorFlow tensors, in which a tensor is described as a generalization of vectors and matrices to potentially higher dimensions (e.g., n-dimensional arrays of base data types), and is not necessarily limited to specific transformation laws. For example, for the general loss function $f,$, it may be necessary to store the fields, $x_i$, for all time steps, $i.$. This is because, for most choices of $f$, the gradient will be a function of the arguments of $f,$. This difficulty is compounded by the fact that the values of $$\frac{\partial L}{\partial x_i}$$

for larger values of $i$ are needed before the values for smaller $i$ due to the incremental updates of the field response and/or through backpropagation of the loss metric, which may prevent the use of schemes that attempt to store only the values $$\frac{\partial L}{\partial x_i},$$

at an immediate time step.

An additional difficulty is further illustrated when computing the structural gradient, $$\frac{dL}{dz},$$

which is given by:

$$\frac{dL}{dz} = \sum_i \frac{dL}{dx_i} \frac{\partial x_i}{\partial z}. \tag{4}$$

For completeness, the full form of the first term in the sum, $$\frac{dL}{dz},$$

is expressed as:

$$\frac{dL}{dx_i} = \frac{\partial L}{\partial x_i} + \frac{dL}{dx_{i+1}} \frac{\partial x_{i+1}}{\partial x_{i+1}}. \tag{5}$$

Based on the definition of $\phi$ as described by equation (3), it is noted that $$\frac{\partial x_{i+1}}{\partial x_i} = A(z),$$

which can be substituted in equation (5) to arrive at an adjoint update for backpropagation (e.g., the update operations such as update operation 756), which can be expressed as:

$$\frac{dL}{dx_i} = \frac{\partial L}{\partial x_i} + \frac{dL}{dx_{i+1}} A(z), \tag{6}$$

or $$\nabla x_i L = A(z)^T \nabla x_{i+1} L + \frac{\partial L^T}{\partial x_i}. \tag{7}$$

The adjoint update is the backpropagation of the loss gradient (e.g., from the loss metric) from later to earlier time steps and may be referred to as a backwards solve for $$\frac{dL}{dx_i}.$$

More specifically, the loss gradient may initially be based upon the backpropagation of a loss metric determined from the operational simulation with the loss function. The second term in the sum of the structural gradient, $$\frac{dL}{dz},$$

corresponds to the field gradient and is denoted as:

$$\frac{\partial x_i}{\partial z} = \frac{d\phi(x_{i-1}, b_{i-1}, z)}{dz} = \frac{dA(z)}{dz} x_{i-1} + \frac{dB(z)}{dz} b_{i-1}, \tag{8}$$

for the particular form of $\phi$ described by equation (3). Thus, each term of the sum associated $$\frac{dL}{dz}$$

depends on both $$\frac{dL}{dx_{i_0}} \text{ for } i >= i_0 \text{ and } x_{i_0} \text{ for } i < i_0.$$

Since the dependency chains of these two terms are in opposite directions, it is concluded that computing $$\frac{dL}{dz}$$

in this way requires the storage of $x_i$ values for all of $i$. In some embodiments, the need to store all field values may be mitigated by a reduced representation of the fields.

Figure 8:
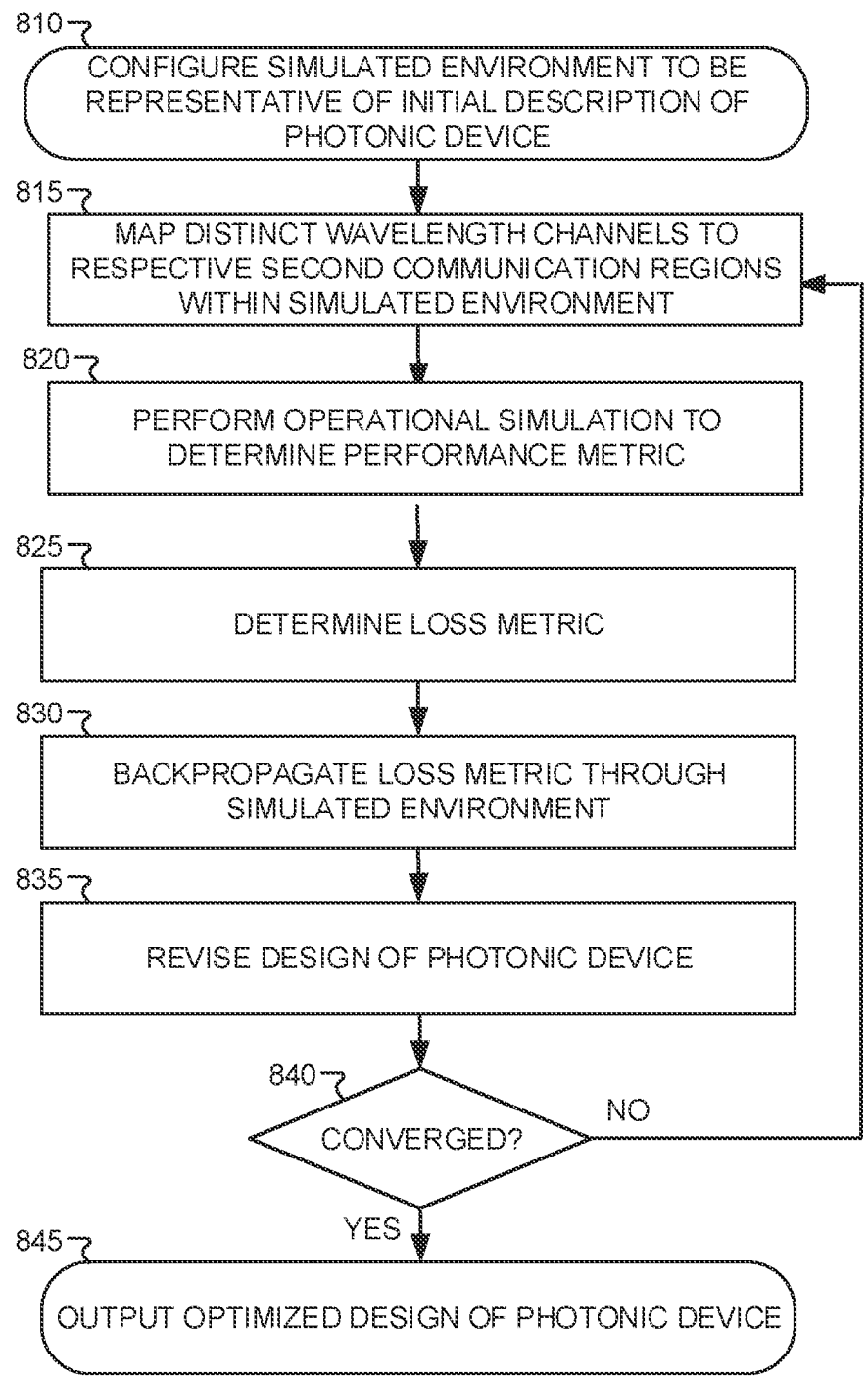
FIG. 8 shows an example method for generating a design of a photonic integrated circuit, in accordance with embodiments of the present disclosure.

FIG. 8 shows an example method 800 for generating a design of a photonic device, in accordance with embodiments of the present disclosure. It is appreciated that method 800 is an inverse design process that may be accomplished by performing operations with a system (e.g., system 500 of FIG. 5) to perform iterative optimization of a loss metric determined from a loss function that includes a performance loss and a fabrication loss. In some embodiments, method 800 may be included as instructions provided by at least one machine-accessible storage medium (e.g., non-transitory memory) that, when executed by a machine, will cause the machine to perform operations for generating the design of the photonic device. It is further appreciated that the order in which some or all of the process blocks appear in method 800 should not be deemed limiting. Rather, one of ordinary skill in the art having the benefit of the present disclosure will understand that some of the process blocks may be executed in a variety of orders not illustrated, or even in parallel.

Block 810 illustrates configuration of a simulated environment to be representative of an initial description of a photonic device that has been received or otherwise obtained. In some embodiments, the photonic device may be expected to have a certain functionality (e.g., perform as an optical demultiplexer) after optimization. The initial description may describe structural parameters of the photonic device within a simulated environment. The simulated environment may include a plurality of voxels that collectively describe the structural parameters of the photonic device. Each of the plurality of voxels is associated with a structural value to describe the structural parameters, a field value to describe the field response (e.g., the electric and magnetic fields in one or more orthogonal directions) to physical stimuli (e.g., one or more excitation sources), and a source value to describe the physical stimuli. Once the initial description has been received or otherwise obtained, the simulated environment is configured (e.g., the number of voxels, shape/arrangement of voxels, and specific values for the structural value, field value, and/or source value of the voxels are set based on the initial description). In some embodiments the initial description may be a first description of the physical device in which values for the structural parameters may be random values or null values outside of input and output regions such that there is no bias for the initial (e.g., first) design. It is appreciated that the initial description or input design may be a relative term. Thus, in some embodiments an initial description may be a first description of the physical device described within the context of the simulated environment (e.g., a first input design for performing a first operational simulation).

However, in other embodiments, the term initial description may refer to an initial description of a particular cycle (e.g., of performing an operational simulation, operating an adjoint simulation, and updating the structural parameters). In such an embodiment, the initial description or design of that particular cycle may correspond to a revised description or refined design (e.g., generated from a previous cycle). In some embodiments, the simulated environment includes a design region that includes a portion of the plurality of voxels which have structural parameters that may be updated, revised, or otherwise changed to optimize the structural parameters of the photonic device. In some embodiments, the structural parameters are associated with geometric boundaries and/or material compositions of the physical device based on the material properties (e.g., relative permittivity, index of refraction, etc.) of the simulated environment.

In some embodiments the simulated environment includes a design region optically coupled between a first communication region and a plurality of second communication regions. In some embodiments, the first communication region may correspond to an input region or port (e.g., where an excitation source originates), while the second communication may correspond to a plurality of output regions or ports (e.g., when designing an optical demultiplexer that optically separates a plurality of distinct wavelength channels included in a multi-channel optical signal received at the input port and respectively guiding each of the distinct wavelength channels to a corresponding one of the plurality of output ports). However, in other embodiments, the first communication region may correspond to an output region or port, while the plurality of second communication regions corresponds to a plurality of input ports or region (e.g., when designing an optical multiplexer that optically combines a plurality of distinct wavelength signals received at respective ones of the plurality of input ports to form a multi-channel optical signal that is guided to the output port).

Block 815 shows mapping a wavelength channel and a throughput signal to two respective second communication regions. The wavelength channel and the throughput signal may be mapped to the second communication regions by virtue of the initial description of the photonic device. For example, a loss function may be chosen that associates a performance metric of the photonic device with power transmission from the input port to individual output ports. In some embodiments, a first channel included in the plurality of distinct wavelength channels is mapped to a first output port, meaning that the performance metric of the photonic device for the first channel is tied to the first output port.

In some embodiments, the plurality of second communication regions includes two communication regions and the plurality of distinct wavelength channels includes four distinct wavelength channels, such that the input signal that includes the four channels is partially demultiplexed into an output signal including one channel and a throughput signal including three channels. Similarly, an input signal may include a different number of channels (e.g., 3 channels, 4 channels, 5 channels, 6 channels, 7 channels, 8 channels, etc.), such that a throughput signal may include as many as one less than the total number of channels, and a demultiplexer may include as many photonic devices, each acting as a photonic device in a cascaded arrangement. In this way, the operations of method 800 may be executed for each photonic device individually, such that the photonic integrated circuit including the constituent photonic devices is optimized to demultiplex a multichannel input signal according to a demultiplexing sequence.

Block 820 illustrates performing an operational simulation of the photonic device within the simulated environment operating in response to one or more excitation sources to determine a performance metric. More specifically, an electromagnetic simulation is performed in which a field response of the photonic device is updated incrementally over a plurality of time steps to determine how the how the field response of the physical device changes due to the excitation source. The field values of the plurality of voxels are updated in response to the excitation source and based, at least in part, on the structural parameters of the integrated photonic circuit. Additionally, each update operation at a particular time step may also be based, at least in part, on a previous (e.g., immediately prior) time step.

Consequently, the operational simulation simulates an interaction between the photonic device and a physical stimulus (e.g., one or more excitation sources) to determine a simulated output of the photonic device (e.g., at one or more of the output ports or regions) in response to the physical stimuli. The interaction may correspond to any one of, or combination of a perturbation, retransmission, attenuation, dispersion, refraction, reflection, diffraction, absorption, scattering, amplification, or otherwise of the physical stimuli within electromagnetic domain due, at least in part, to the structural parameters of the photonic device and underlying physics governing operation of the photonic device. Thus, the operational simulation simulates how the field response of the simulated environment changes due to the excitation source over a plurality of time steps (e.g., from an initial to final time step with a pre-determined step size).

In some embodiments, the simulated output may be utilized to determine one or more performance metrics of the photonic device. The excitation source may originate at or be disposed proximate to the first communication region (i.e., input port) when performing the operational simulation. During the operational simulation, a field response at the respective output port may then be used to determine a simulated power transmission of the photonic device for the selected distinct wavelength channel. In this way, the operational simulation may determine a simulated power transmission of the excitation source from the first communication region, through the design region, and to a respective one of the plurality of second communication regions mapped to the selected one of the plurality of distinct wavelength channels. In some embodiments, one or more frequencies that span the passband of a given one of the plurality of distinct wavelength channels is selected randomly to optimize the design (e.g., batch gradient descent while having a full width of each passband including ripple in the passband that meets the target specifications). In some embodiments, each of the plurality of distinct wavelength channels has a common bandwidth with different center wavelengths.

Block 825 shows determining a loss metric based on a performance loss associated with a performance metric and a fabrication loss associated with a minimum feature size. In some embodiments the loss metric is determined via a loss function that includes both the performance loss and the fabrication loss as input values. The performance loss may correspond to a difference between the performance metric and a target performance metric of the photonic device. In some embodiments, a minimum feature size for the design region of the simulated environment may be provided to promote fabricability of the design generated by the inverse design process. The fabrication loss is based, at least in part, on the minimum feature size and the structural parameters of the design region. More specifically, the fabrication loss enforces the minimum feature size for the design such that the design region does not have structural elements with a diameter less than the minimum feature size. This helps this system provide designs that meet certain fabricability and/or yield requirements. In some embodiments the fabrication loss also helps enforce binarization of the design (i.e., rather than mixing the first and second materials together to form a third material, the design includes regions of the first material and the second material that are heterogeneously distributed). In some embodiments, the minimum feature size may include a minimum feature shape.

In some embodiments, the design generated by the inverse design process optimizes at least one of the first material (e.g., first material 421 of FIG. 4A) or the second material (e.g., second material 423 of FIG. 4A) to be structured within the design region (e.g., dispersion region 430 of FIG. 4A) to be schematically reproducible by a feature shape with a predetermined width. For example, the shape and arrangement of the first material and/or the second material within the design region may be reproduced (e.g., drawn) with a brush having a size that corresponds to the feature shape and a width corresponding to the predetermined width. In some embodiments, the feature shape includes at least one of a circle, a square, a hexagon, an octagon, or any other shape. In some embodiments, the feature shape is a singular shape that may be rotated, flipped, and/or overlapped with a portion of another feature shape. For example, if the feature shape is an octagon, two overlapping octagons each corresponding to the feature shape may partially overlap one another to produce a different shape. In other embodiments, the feature shape may only be a tileable unit that does not overlap (i.e., an indivisible unit of the design). In some embodiments, the predetermined width of the feature shape may be between 20 nm and 200 nm. For example, the predetermined width of the feature shape may be 100 nm, 140 nm, 180 nm, or otherwise. In some embodiments the feature shape and the predetermined width of the feature shape correspond to the minimum feature size of the design. For example, the first material 421 of dispersive region 430-1 of FIG. 4A may be schematically reproduced by an octagon having a width of 100 nm.

In some embodiments, the fabrication loss is determined by generating a convolution kernel (e.g., circular, square, octagonal, or otherwise) with a width equal to the minimum feature size. The convolution kernel is then shifted through the design region of the simulated environment to determine voxel locations (i.e., individual voxels) within the design region that fit the convolution kernel within the design region without extending beyond the design region. The convolution kernel is then convolved at each of the voxel locations with the structural parameters associated with the voxel locations to determine first fabrication values. The structural parameters are then inverted and the convolution kernel is convolved again at each of the voxel locations with the inverted structural parameters to determine second fabrication values. The first and second fabrication values are subsequently combined to determine the fabrication loss for the design region. This process of determining the fabrication loss may promote structural elements of the design region having a radius of curvature less having a magnitude of less than a threshold size (i.e., inverse of half the minimum feature size).

Block 830 illustrates backpropagating the loss metric via the loss function through the simulated environment to determine an influence of changes in the structural parameters on the loss metric (i.e., structural gradient). The loss metric is treated as an adjoint or virtual source and is backpropagated incrementally from a final time step to earlier time steps in a backwards simulation to determine the structural gradient of the photonic device.

Block 835 shows revising a design of the photonic device (e.g., generated a revised description) by updating the structural parameters to adjust the loss metric. In some embodiments, adjusting for the loss metric may reduce the loss metric. However, in other embodiments, the loss metric may be adjusted or otherwise compensated in a manner that does not necessarily reduce the loss metric, In some embodiments, adjusting the loss metric may maintain fabricability while providing a general direction within the parameterization space to obtain designs that will ultimately result in increased performance while also maintaining device fabricability and targeted performance metrics. In some embodiments, the revised description is generated by utilizing an optimization scheme after a cycle of operational and adjoint simulations via a gradient descent algorithm, Markov Chain Monte Carlo algorithm, or other optimization techniques. In this way, iterative cycles of simulating the photonic device, determining a loss metric, backpropagating the loss metric, and updating the structural parameters to adjust the loss metric may be successively performed until the loss metric substantially converges such that the difference between the performance metric and the target performance metric is within a threshold range while also accounting for fabricability and binarization due to the fabrication loss. In some embodiments, the term "converges" may simply indicate the difference is within the threshold range and/or below some threshold value.

Block 840 illustrates determining whether the loss metric substantially converges such that the difference between the performance metric and the target performance metric is within a threshold range. Iterative cycles of simulating the photonic device with the excitation source selected from the plurality of distinct wavelength channels, backpropagating the loss metric, and revising the design by updating the structural parameters to reduce the loss metric until the loss metric substantially converges such that the difference between the performance metric and the target performance metric is within a threshold range. In some embodiments, the structural parameters of the design region of the integrated photonic circuit are revised when performing the cycles to cause the design region of the photonic device to optically separate a distinct wavelength channel and a multi-channel throughput signal from a multi-channel optical signal received via the first communication region and guide each respective output to the corresponding one of the plurality of second communication regions based on the mapping of block 815.

Block 845 illustrates outputting an optimized design of the photonic device in which the structural parameters have been updated to have the difference between the performance metric and the target performance metric within a threshold range while also enforcing a minimum feature size and binarization.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible machine-readable storage medium includes any mechanism that provides (i.e., stores) information in a non-transitory form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A photonic integrated circuit comprising:
a first photonic device for partially demultiplexing an input signal, the first photonic device comprising:
an input region to receive the input signal, wherein the input signal includes a plurality of multiplexed channels including a first channel;
a metastructured dispersive region optically coupled with the input region to receive the input signal, wherein the metastructured dispersive region includes a heterogeneous distribution of a first material and a second material that structures the metastructured dispersive region to partially demultiplex the input signal into an output signal and a throughput signal, wherein the output signal includes the first channel, and wherein the throughput signal includes each remaining channel included in the plurality of multiplexed channels;
an output region optically coupled with the metastructured dispersive region to receive the output signal; and
a throughput region optically coupled with the metastructured dispersive region to receive the throughput signal, wherein the throughput region is physically separated from the output region; and
a second photonic device for demultiplexing the throughput signal, the second photonic device comprising:
a second metastructured dispersive region optically coupled with the throughput region of the first photonic device to receive the throughput signal, wherein the second metastructured dispersive region includes a second heterogeneous distribution of the first material and the second material that structures the second metastructured dispersive region to at least partially demultiplex the throughput signal into a second output signal and a second throughput signal, wherein the second output signal includes a second channel included in the throughput signal, and wherein the second throughput signal includes each remaining channel included in the throughput signal.

2. The photonic integrated circuit of claim 1, wherein:

the input signal comprises n multiplexed channels, where "n" is a nonzero integer greater than two;

the photonic integrated circuit comprises a total of n-1 photonic devices, each optically coupled with the first photonic device via a cascaded arrangement to receive a respective throughput signal;

each of the photonic devices comprises a respective metastructured dispersive region structured to partially demultiplex the respective throughput signal into a respective output signal including a respective output channel; and the cascaded arrangement defines a demultiplexing sequence provided by the photonic integrated circuit in response to the input signal, the demultiplexing sequence comprising:

$$\text{output}(i) = \begin{cases} \text{channel}(j), & \text{for odd } i \\ \text{channel}(n-j), & \text{for even } i \end{cases}$$

where "i" is an integer from 1 to n-1, "j" is an integer defined as j=ceiling(i/2), "output(i)" describes the respective output channel of a corresponding one of the n-1 photonic devices, and "channel(j)" or "channel(n-j)" describes a respective channel of the plurality of multiplexed channels included in the respective output signal of the corresponding one of the n-1 photonic devices.

3. The photonic integrated circuit of claim 2, wherein:

the plurality of multiplexed channels comprises four distinct wavelength channels (n=4), characterized by four respective center wavelengths $\lambda_1 < \lambda_2 < \lambda_3 < \lambda_4$;

the photonic integrated circuit comprises three photonic devices (n-1); and the demultiplexing sequence for the respective output channels of the three photonic devices is: $\text{output}_1 = \lambda_1$, $\text{output}_2 = \lambda_3$, $\text{output}_3 = \lambda_2$.

4. The photonic integrated circuit of claim 3, wherein:

$\lambda_1$ is about 1271 nm;

$\lambda_2$ is about 1291 nm; and $\lambda_3$ is about 1311 nm.

5. The photonic integrated circuit of claim 1, wherein the plurality of multiplexed channels further includes a second channel, wherein the output signal further includes the second channel, and wherein the second channel included in the output signal has a lower optical power relative to the first channel included in the output signal.

6. The photonic integrated circuit of claim 1, further comprising:

a channel purifier optically coupled with the output region to receive the output signal, wherein the channel purifier comprises an energy selective filter configured to select the first channel and to attenuate channels included in the plurality of multiplexed channels other than the first channel.

7. The photonic integrated circuit of claim 6, wherein the channel purifier comprises a bandpass filter characterized by a passband centered around a respective wavelength of the first channel.

8. The photonic integrated circuit of claim 7, wherein the channel purifier is configured to attenuate channels outside the passband by about 20 dB or greater.

9. The photonic integrated circuit of claim 1, further comprising a temperature control circuit, thermally coupled with the photonic device to maintain a temperature of the metastructured dispersive region.

10. The photonic integrated circuit of claim 1, wherein the metastructured dispersive region defines a first side and a second side, wherein the input region and the output region are optically coupled with the first side, and wherein the throughput region is optically coupled with the second side.

11. The photonic integrated circuit of claim 1, wherein the metastructured dispersive region defines a first side and a second side, wherein the input region is optically coupled with the first side, and wherein the output region and the throughput region are optically coupled with the second side.

12. A method of partially demultiplexing a multiplexed input signal, the method comprising:

receiving an input signal at an input region of a first photonic device, the input signal comprising a plurality of multiplexed channels including a first channel;

partially demultiplexing the input signal into an output signal and a throughput signal with a metastructured dispersive region of the first photonic device optically coupled with the input region of the first photonic device, wherein the metastructured dispersive region includes a heterogeneous distribution of a first material and a second material that structures the metastructured dispersive region to partially demultiplex the input signal into the output signal and the throughput signal, wherein the output signal includes the first channel, and wherein the throughput signal includes each remaining channel included in the plurality of multiplexed channels;

outputting the output signal to an output region of the first photonic device, the output region being optically coupled with the metastructured dispersive region to receive the output signal;

outputting the throughput signal from a throughput region of the first photonic device optically coupled with the metastructured dispersive region, wherein the throughput region is physically separated from the output region;

receiving the throughput signal at a second input region of a second photonic device, optically coupled with the throughput region of the first photonic device to receive the throughput signal, the second photonic device comprising:

a second metastructured dispersive region including a second heterogeneous distribution of the first material and the second material that structures the second metastructured dispersive region to at least partially demultiplex the throughput signal into a second output signal and a second throughput signal, wherein the second output signal includes a second channel included in the throughput signal, and wherein the second throughput signal includes each remaining channel included in the throughput signal; and partially demultiplexing the throughput signal into the second output signal and the second throughput signal.

13. The method of claim 12, wherein the input signal comprises n multiplexed channels, where "n" is a nonzero integer greater than two, wherein the photonic integrated circuit comprises a total of n-1 photonic devices, each optically coupled with the first photonic device via a cascaded arrangement to receive a respective throughput signal, wherein each of the photonic devices comprises a respective metastructured dispersive region structured to partially demultiplex the respective throughput signal into a respective output signal including a respective output channel, and wherein the method further comprises:

demultiplexing the n channels of the input signal by the n-1 photonic devices, wherein the cascaded arrangement defines a demultiplexing sequence provided by the photonic integrated circuit in response to the input signal, the demultiplexing sequence comprising:

$$\text{output}(i) = \begin{cases} \text{channel}(j), & \text{for odd } i \\ \text{channel}(n-j), & \text{for even } i \end{cases}$$

where "i" is an integer from 1 to n-1, "j" is an integer defined as j=ceiling(i/2), "output(i)" describes the respective output channel of a corresponding one of the n-1 photonic devices, and "channel(j)" or "channel(n-j)" describes a respective channel of the plurality of multiplexed channels included in the respective output signal of the corresponding one of the n-1 photonic devices.

14. The method of claim 12, wherein the plurality of multiplexed channels further includes a second channel, wherein the output signal further includes the second channel, and wherein the second channel included in the output signal has a lower optical power relative to the first channel included in the output signal.

15. The method of claim 12, further comprising:

providing the output channel to a channel purifier optically coupled with the output region of the first photonic device to receive the output signal, wherein the channel purifier comprises an energy selective filter configured to pass the output channel and to attenuate the remaining multiplexed channels.

16. The method of claim 15, wherein the channel purifier comprises a bandpass filter characterized by a passband centered around a respective wavelength of the respective output channel.

17. The method of claim 16, wherein the channel purifier is configured to attenuate channels of the multiplexed channels outside the passband by about 20 dB or greater.

18. The method of claim 12, further comprising maintaining a temperature of the metastructured dispersive region using a temperature control circuit in thermal communication with the metastructured dispersive region.

19. A photonic integrated circuit comprising:

a photonic device for partially demultiplexing an input signal, the photonic device comprising:

an input region to receive the input signal, wherein the input signal consists of a plurality of multiplexed channels comprising more than two multiplexed channels including a first channel;

a metastructured dispersive region optically coupled with the input region to receive the input signal, wherein the metastructured dispersive region includes a heterogeneous distribution of a first material and a second material that structures the metastructured dispersive region to partially demultiplex the input signal into an output signal and a throughput signal, wherein the output signal includes the first channel, wherein the throughput signal includes each other channel included in the plurality of multiplexed channels but for the first channel;

an output region optically coupled with the metastructured dispersive region to receive the output signal; and a throughput region optically coupled with the metastructured dispersive region to receive the throughput signal, wherein the throughput region is physically separated from the output region.

20. The photonic integrated circuit of claim 19, wherein the first channel has a wavelength shorter than a longest wavelength channel of the plurality of multiplexed channels and wherein the first channel has a wavelength longer than a shortest wavelength channel of the plurality of multiplexed channels.

21. A photonic integrated circuit comprising:

a photonic device for partially demultiplexing an input signal, the photonic device comprising:

an input region to receive the input signal, wherein the input signal includes a plurality of multiplexed channels comprising more than two multiplexed channels including a first channel;

a metastructured dispersive region optically coupled with the input region to receive the input signal, wherein the metastructured dispersive region includes a heterogeneous distribution of a first material and a second material that structures the metastructured dispersive region to partially demultiplex the input signal into an output signal and a throughput signal, wherein the output signal includes the first channel, wherein the throughput signal includes the two or more remaining channels included in the plurality of multiplexed channels, wherein the first channel has a wavelength shorter than a longest wavelength channel of the plurality of multiplexed channels, and wherein the wavelength of the first channel is longer than a shortest wavelength channel of the plurality of multiplexed channels;

an output region optically coupled with the metastructured dispersive region to receive the output signal; and a throughput region optically coupled with the metastructured dispersive region to receive the throughput signal, wherein the throughput region is physically separated from the output region.

22. A photonic integrated circuit comprising:

a photonic device for partially demultiplexing an input signal, the photonic device comprising:

an input region to receive the input signal, wherein the input signal includes a plurality of multiplexed channels comprising more than two multiplexed channels including a first channel;

a metastructured dispersive region optically coupled with the input region to receive the input signal, wherein the metastructured dispersive region includes a heterogeneous distribution of a first material and a second material that structures the metastructured dispersive region to partially demultiplex the input signal into an output signal and a throughput signal, wherein the output signal includes the first channel and no other channels, and wherein the throughput signal includes each other channel included in the plurality of multiplexed channels but for the first channel;

an output region optically coupled with the metastructured dispersive region to receive the output signal; and a throughput region optically coupled with the metastructured dispersive region to receive the throughput signal, wherein the throughput region is physically separated from the output region.

* * * * *